United States Patent [19]

Tupper et al.

[11] Patent Number: 4,600,874
[45] Date of Patent: Jul. 15, 1986

[54] EXCITATION CURRENT CONTROL FOR INDUCTION MOTOR DRIVE USING LOAD COMMUTATED INVERTER CIRCUIT

[75] Inventors: Leland C. Tupper, Schenectady, N.Y.; Loren H. Walker; Herbert W. Weiss, both of Salem, Va.; James W. Sember, Roanoke, Va.

[73] Assignee: General Electric Company, Salem, Va.

[21] Appl. No.: 705,962

[22] Filed: Feb. 26, 1985

[51] Int. Cl.$^4$ .......................... H02P 5/40; H02J 3/18
[52] U.S. Cl. .................................. 318/798; 318/805; 318/814; 323/207
[58] Field of Search ............... 318/802, 803, 805, 798, 318/729, 814, 807–811; 323/207–211; 363/37, 41, 138

[56] References Cited

U.S. PATENT DOCUMENTS

| | | | |
|---|---|---|---|
| 3,207,974 | 9/1965 | McMurray | 321/45 |
| 3,555,396 | 1/1971 | Kalman | 323/207 |
| 3,959,719 | 5/1976 | Espelage | 323/207 |
| 4,001,670 | 1/1977 | Gyugyi et al. | 323/207 |
| 4,039,926 | 8/1977 | Steigerwald | 323/207 |
| 4,446,414 | 5/1984 | Tupper | 318/723 |
| 4,449,087 | 5/1984 | Lippitt et al. | 318/723 |
| 4,454,470 | 6/1984 | Boettner et al. | 324/78 R |
| 4,476,424 | 10/1984 | Kalman | 318/737 |
| 4,496,899 | 1/1985 | Lippitt et al. | |
| 4,532,465 | 7/1985 | Renard | 318/814 |

OTHER PUBLICATIONS

Iwasaki, et al., "Current-Fed Inverter with Status Var Generator for Induction Motor Drive" *Electrical Engineering* in Japan—vol. 103, No. 3, 1983.

Primary Examiner—David Smith, Jr.
Attorney, Agent, or Firm—Arnold E. Renner

[57] ABSTRACT

A system for controlling the operation of an alternating current induction motor having windings supplied by electrical power from the polyphase alternating current source includes a load commutated inverter circuit which is connected between the power source and the induction motor for furnishing electrical power to the motor. Controllers responsive to a command signal and a feedback signal indicative of motor operating parameters control the operation of said load commutated inverter circuit. There is further provided a fixed capacitor circuit connected between the windings of the motor for supplying reactive volt amperes (VARs) to said load commutated inverter circuit and said motor. Finally, there is provided a variable VAR generator connected between the motor windings for supplying VARs to said load commutated inverter circuit and said motor in response to the output of a third feedback control path which is also responsive to a command signal and prescribed operating parameter(s) of said load and/or said commutated inverter.

27 Claims, 25 Drawing Figures

Microfiche Appendix Included
(11 Microfiche, 651 Pages)

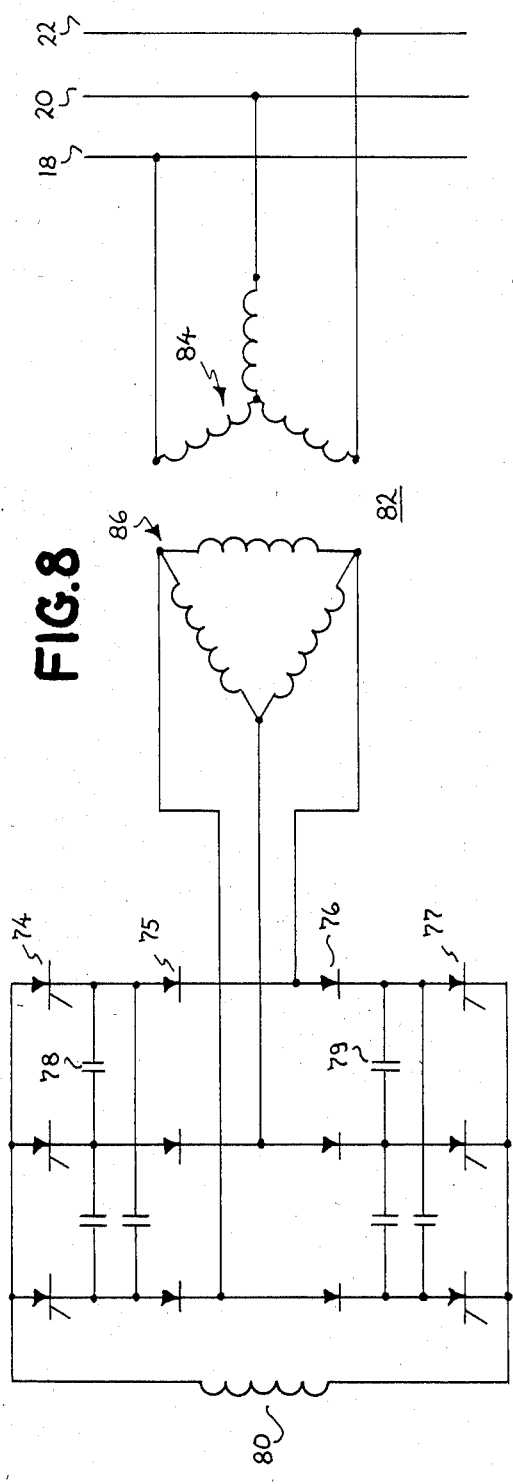
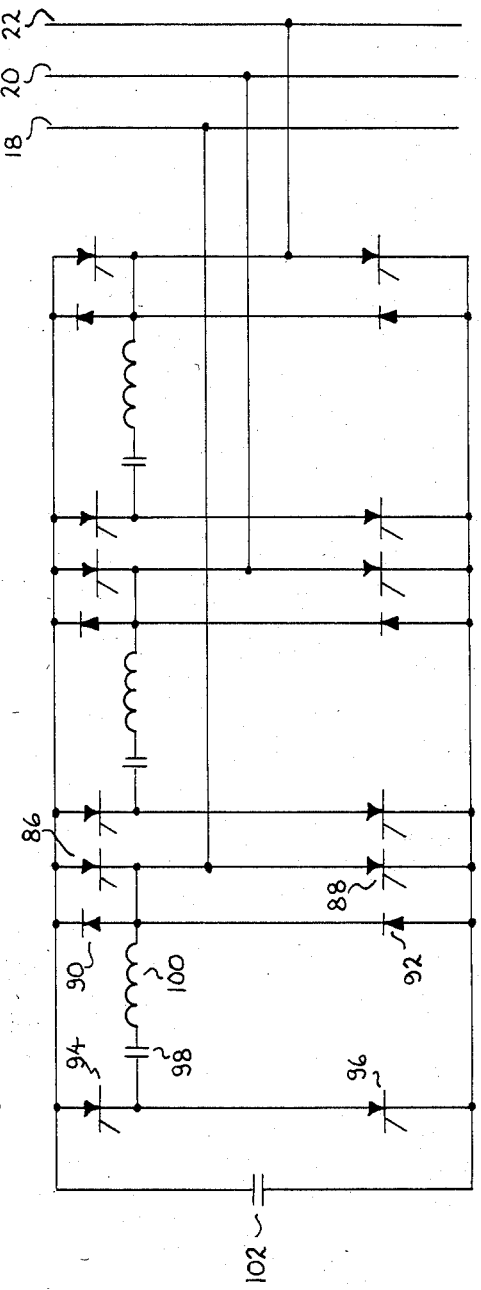
FIG.8
FIG.9

EXCITATION CURRENT CONTROL FOR INDUCTION MOTOR DRIVE USING LOAD COMMUTATED INVERTER CIRCUIT

REFERENCED MATERIAL

Reference is made to a microfiche appendix which sets forth a computer program including that which is applicable to the present invention. Included are 11 microfiche containing a total of 651 frames.

CROSS REFERENCE TO RELATED APPLICATIONS

The present invention is related to those described in U.S. Patent applications Ser. No. 705,961, "Induction Motor Drive Using Load Commutated Inverter Circuit" by H. W. Weiss et al.; Ser. No. 705,963, "Control For Induction Motor Drive Using Load Commutated Inverter Circuit" by L. H. Walker; Ser. No. 705,964, "Flux Control for Induction Motor Drive Using Load Commutated Inverter Circuit" by J. W. Sember et al.; and Ser. No. 705,920, "Alternating Current Motor Drive Having Current Filter" by L. H. Walker; all which were filed on even date herewith, are assigned to the assignee of the present invention and are specifically incorporated hereinto by reference.

BACKGROUND OF THE INVENTION

The present invention relates generally to the control of electric motors and, more particularly, to a scheme for controlling an alternating current (AC) induction motor using a load commutated inverter circuit (LCI) for supplying electrical power to the motor.

It is common, in the discipline of motor drives, to employ power converter systems to furnish electrical power from a source to the motor. These power converters are of various types but, in the higher voltage and power ranges, are often comprised of thyristors in a bridge arrangement. The thyristors of the bridge are selectively gated in what is commonly known as phase control to vary or control the electrical power supplied to the motor. In adjustable speed AC motor drives, it is common to use two such converters, the first of which serves to convert AC power from a source (e.g., power lines) to direct current (DC) power. The second converter which is connected to the first by way of a DC link circuit serves to convert the DC power supplied thereto into variable frequency AC power which is supplied to the motor. The first (source side) converter is controlled to vary the amount of current which is furnished to the motor while the second (load side) converter—commonly called an inverter—is used to vary the frequency of the power that is supplied to the motor.

The source side converter for a typical three phase system is a six-thyristor bridge which is phase controlled to vary the output current or voltage. The load side converter, or inverter, is usually one of two general types, a load commutated inverter or a forced commutated inverter. By commutated, it is meant rendering the thyristors of the bridge non-conductive.

As is generally known in the art, to render a thyristor non-conductive, the current within the thyristor must be reduced to essentially zero value as by placing a reverse voltage across the thyristor. In a source side converter, this is normally not a problem since the converter acts basically as a rectifier and the gating on of one thyristor will effect a commutation of the then conducting thyristor since the AC source (e.g., power lines) to which the converter is connected will inherently develop the reverse voltage. In the load side converter which is supplied with DC power, however, it is commonly known that some form of reactive volt-amperes (VARs) must be present in order to effect commutation. In the load commutated inverter, these VARs are derived from the load. In the force commutated inverter there is some means such as a capacitor which is appropriately charged and at the proper time the charge on that capacitor is used to commutate the inverter.

In the discipline of variable speed AC motor drives, at lower voltages (e.g., below 1000 volts) the preferred drive has used a cage type induction motor which is supplied by a forced commutated inverter such as a square wave inverter, a pulse width modulated inverter or a current source inverter. The induction motor is preferred because of its simplicity and its more rugged nature. These advantages of the induction motor have overcome the disadvantages of the necessary commutation circuitry of a forced commutated inverter. This technology, however, has been generally limited to inverters in which a single main or power thyristor switching device is provided in each inverter leg because of the technical difficulties associated with parallel or series connected thyristors required for higher powered ratings. For example, it is extremely difficult to get precise simultaneous forced commutation of multiple thyristors included in series in one leg of a bridge where the voltage requirements exceed those of a single thyristor. At higher voltages (e.g. above 1000 volts), therefore, it has been the practice to use a load commutated inverter to supply a synchronous motor.

A load commutated inverter system having both source side and load side converters of the type mentioned above is normally regarded as suited to pass real current from one AC source to another (or a load) while drawing a lagging reactive current from both its source and load sides. Thus, as a motor drive, it is usually used to drive a synchronous motor and not an induction motor. This is because a synchronous motor, which has its rotor excited by a DC current, is able to serve as a source of lagging reactive current to the load side of the LCI and thus effect commutation. The LCI is not usually regarded as a suitable source for driving an induction motor because the motor, like the LCI, requires a source of lagging reactive current at its terminals. Thus, while the load commutated inverter or LCI is less expensive and capable of handling higher voltages, it has not been deemed suitable for use with the simpler and less expensive induction motor.

SUMMARY OF THE INVENTION

It is, therefore, an object of the present invention to provide an AC induction motor drive using a load commutated inverter circuit.

It is another object to provide an induction motor drive using a load commutated inverter circuit to supply current to the motor and the combination of a capacitor circuit and a variable VAR generator to furnish the system with the remaining required reactive currents or VARs.

It is a further object to provide an induction motor drive using a load commutated inverter circuit and the combination of a capacitor circuit and variable VAR generator in which the load commutated inverter and the variable VAR generator are controlled to maintain the desired motor torque and flux and the requisite VARs to commutate the load commutated inverter circuit and provide proper exciting current to the motor.

The foregoing and other objects are achieved in accordance with the present invention by providing a system in which an alternating current induction motor having windings supplied with electrical power from a polyphase source is connected to that source by way of a load commutated inverter circuit (LCI) including a controllable AC to DC converter connected to the source and a DC to variable frequency AC converter connected to the motor. These two converters are interconnected by a DC link circuit. A first feedback control path, responsive to a command signal and feedback signal indicative of a motor operating parameter is used to control the operation of the AC to DC (source side) converter while a second feedback path, also responsive to a command signal is used to control the operation of the DC to AC (load side) converter which is connected to the motor. A fixed capacitor circuit is connected between the motor windings for supplying leading VARs to the system while a variable VAR generator connected between the motor windings also supplies additional VARs to the overall system in response to a VAR command signal. This VAR command signal is a result of a third feedback control path which is responsive to prescribed operating parameters of the LCI circuit and/or the motor.

BRIEF DESCRIPTION OF THE DRAWING

While the present invention is described in particularity in the claims annexed to and forming a part of this specification, a better understanding of the invention can be had by reference to the following description taken into conjunction with the accompanying drawing in which:

FIGS. 6 through 10 are schematic diagrams of exemplary variable or controllable VAR generators which can find application in the system of the present invention;

DETAILED DESCRIPTION

In the ensuing description and on the several figures, insofar as is practical, like characters will be used to designate like components throughout.

Figure 1:
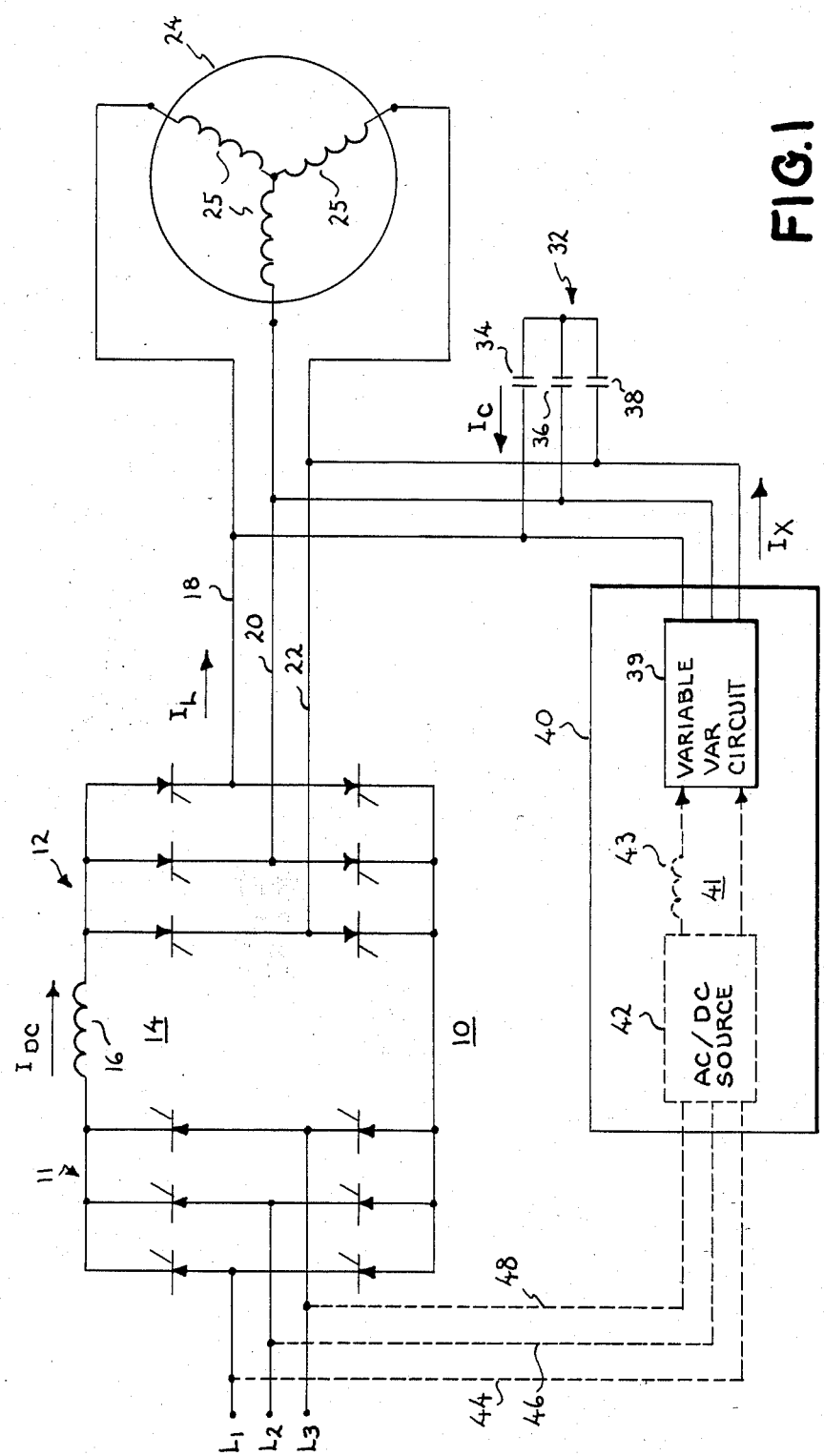
FIG. 1 is a schematic diagram depicting a preferred embodiment of the power circuitry for supplying electrical power to an induction motor in accordance with the present invention.

Reference is now made to FIG. 1 which shows the power circuitry of the induction motor drive of the present invention in accordance with a preferred general embodiment. A power source (three phase) indicated by terminals $L_1$, $L_2$ and $L_3$ is connected to a load commutated inverter circuit shown generally at 10. The load commutated inverter circuit (LCI) includes a source side converter 11 which is connected by way of a DC link 14 including inductor 16 to supply direct current $I_{DC}$ to a source side converter 12. Each of the converters 11 and 12 is shown in the well known manner as comprised of six thyristors connected in a bridge arrangement. It is to be expressly understood that each of the six thyristors is intended to represent either a single thyristor or plural thyristors connected in parallel and/or series depending upon the power requirement of the overall system. An induction motor 24 having windings 25 is connected to the LCI 10, more specifically to the load side inverter 12, by way of three connecting lines 18, 20 and 22 such that a controlled current $I_L$ is supplied to the motor 24. (Although a wye configuration of motor windings is shown, others such as a delta configuration could be used with equal facility.) The primary function of the LCI 10 is to provide real electrical power to the induction motor 24; although, as will be understood and as is employed in certain instances, a lagging exciting current component is also present in the output of the LCI.

Connected to lines 18, 20 and 22 is a capacitor circuit 32 comprised of three capacitors 34, 36 and 38 connected in a wye configuration. These capacitors could also be connected in delta configuration in accordance with good engineering practices. Although the capacitors are shown to be of a fixed value, it is contemplated that switched capacitor circuits could be employed with various capacitors being switched into and out of the circuit as a function of a motor operating parameter; e.g., speed. The primary function of the capacitor circuit is to provide a leading reactive current to excite the induction motor and to provide a portion of the necessary VARs and for effecting commutation of the LCI 10. Also connected across the windings of the motor is a VAR generator 40. The primary function of the VAR generator is to maintain the flux level of the motor by providing additional reactive current which either adds to or subtracts from that supplied to the capacitor circuit and the LCI 10.

As illustrated in FIG. 1, VAR generator 40 includes a circuit 39 which has the actual connections to lines 18, 20 and 22. Possible implementations of circuit 39 will be discussed with respect to FIGS. 6 through 10. Also shown in dash line depiction is an AC to DC power source 42 which is connected to terminals $L_1$, $L_2$ and $L_3$ by lines 44, 46 and 48 and supplies power to circuit 39 via a DC link 41 including, where appropriate, an inductor 43. Such a source of power is not necessary except in those applications where the VAR generator is required to supply real power to the overall system, although it may be desirable for purposes of more complete control of the generator output. As such, in the following description, VAR generator 40, unless otherwise specifically restricted, is intended to represent either the circuit 39 alone or circuit 39 with a power source 42. When included, source 42 would typically be a bridge converter such as that shown by converter 11 of the LCI 10 and control of the two generator 40 components would be essentially of the same nature as for the two LCI converters as will be more fully explained later in this description.

Figure 2:
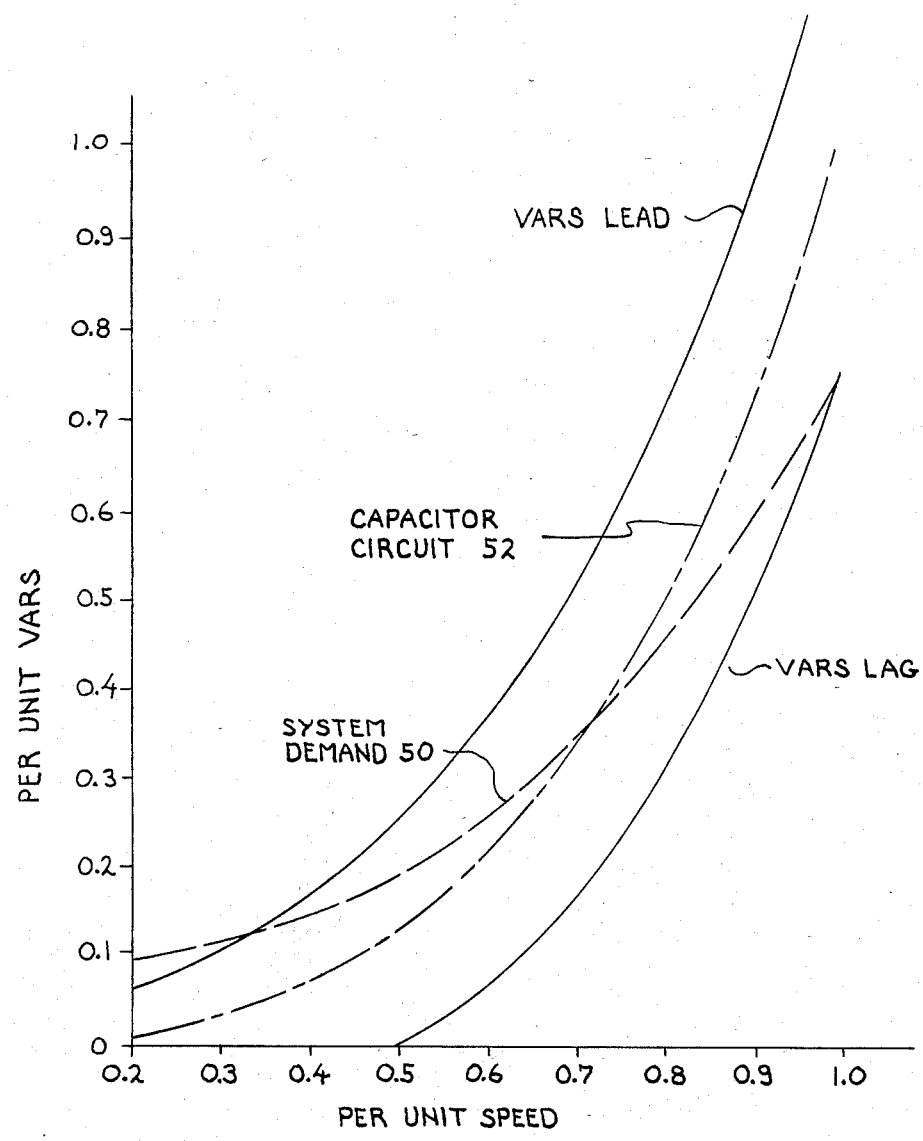
FIG. 2 is a graphical representation of a typical LCI system requirement for VARs as can be furnished by the system of the present invention.

Reference is now made to FIG. 2 which depicts in graphical form the excitation system control range for proper motor excitation and commutation VARs for a typical load in which the motor torque requirement varies approximately as the square of motor speed; e.g., a fan. The showings of FIG. 2 are on a per unit basis with per unit speed as the abscissa and per unit VARs as the ordinate. The particular depiction here, which is considered as typical and illustrative, is for a one per unit capacitor circuit and a 0.25 per unit lead-lag VAR controller; that is, the VAR generator 40 in FIG. 1 is capable of providing 0.25 per unit VARs at rated voltage and frequency either in a leading or lagging fashion. The dashed line 50 of FIG. 2 illustrates the total VAR demand of the system in the speed range from 0.2 per unit to 1 per unit. The dot-dash line 52 illustrates the VARs which can be supplied to the system by the capacitor circuit 32 of FIG. 1. It is seen that with the capacitors alone, the only time that the system has the correct VARs is at approximately 0.7 per unit speed. The solid lines represent the limits of available VARs of the capacitor and VAR generator combined. It is further seen from FIG. 2 that if the VAR generator is capable of providing only leading VARs, the system including capacitor circuit as illustrated is capable of operating in the range of 0.2 to 0.7 per unit speed. Conversely, if only lagging VARs were available, to complement the capacitor circuit 32, then operation in the per unit speed range of 0.7 to 1.0 is permitted. In the most preferred embodiment, therefore, the VAR generator is capable of providing both leading and lagging VARs so that the system demand line is inside the two solid lines from 0.33 to 1.0 speed. Thus, operation of the motor over this wider speed range is possible.

Figure 3:
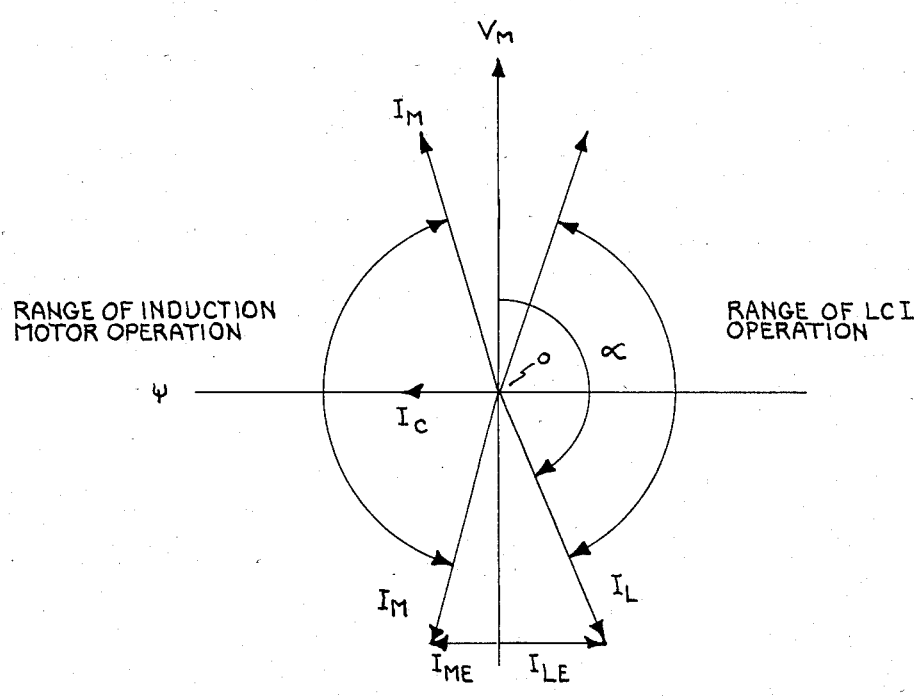
FIGS. 3, 4 and 5 are vector diagrams helpful to the understanding of the present invention.
Figure 4:
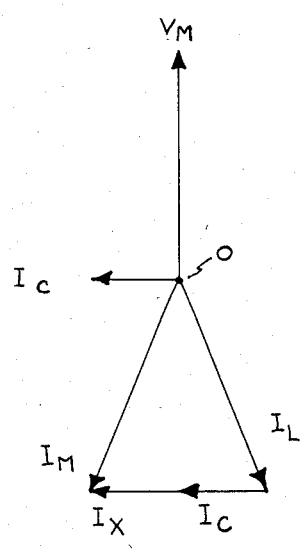
Figure 5:
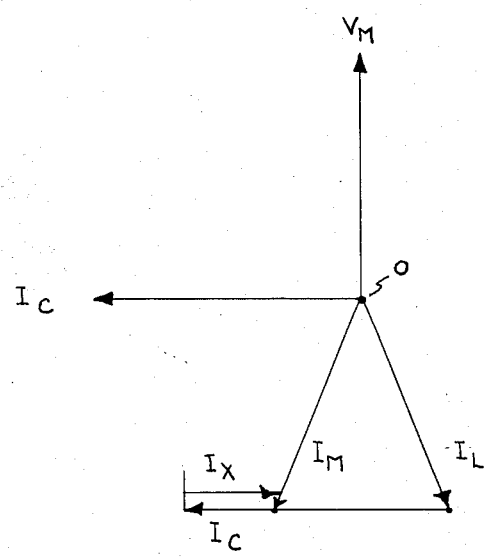

The vector diagrams of FIGS. 3, 4 and 5 taken in conjunction with FIG. 2 provide a better understanding of the operational requirements of the system of the present invention. As earlier stated, load commutated inverters or LCIs principally pass real current from the AC source to the load. Since the induction motor and the load commutated inverter circuit both require a source of lagging reactive current at their terminals, the LCI is not normally considered as a suitable drive for an induction motor.

To better understand the relationship of the various currents at the motor terminals of the basic power circuit as illustrated in FIG. 1, reference is made to FIG. 3. In this diagram, the reference vector is motor air gap voltage which is represented as the vertical vector $V_M$. For ease of understanding this explanation, motor leakages will be ignored so that the motor air gap voltage and the motor terminal voltage are considered the same. Motor current in this diagram can be at any angular position. If it is vertical and in phase with the motor voltage, then the motor is a generator of electrical power. If the current is vertical and directed downward, then the motor is absorbing electrical power and providing mechanical power, normal operation for a motor. If the current is lagging the voltage by 90° (directed to the right in the FIG. 3), then the current tends to reduce air gap flux within the motor. This is called the direct axis current in a synchronous motor/generator. If the current is leading the voltage by 90° (directed to the left in FIG. 3), then the current tends to increase the air gap flux.

A synchronous motor can operate with current at any vector position on this diagram. The induction motor, however, gets its excitation solely from the stator terminals and it must, therefore, be excited by a current which has a component horizontally to the left (the direction which makes flux). Thus, the allowed sector for an induction motor operating in motoring and generating is most of the left half of the vector diagram as noted and labeled "Range of Induction Motor Operation".

A load commutated inverter circuit operates by gating thyristors or other controlled switching devices at a time which is delayed a controllable amount with respect to the gating time which causes full rectifying operation (the gating time that causes the thyristors to conduct as diodes). That gating time is normally defined as the zero delay reference time and the delay from that time expressed in electrical degrees is the angle called alpha ($\alpha$). The current provided by the LCI to the motor is at a phase position determined by the gating delay $\alpha$ on the load side of the LCI. This angle $\alpha$ in the vector diagram of FIG. 2 is measured clockwise from the vertical reference $V_M$ (i.e, the same direction as was the motor current). This reference for $\alpha$ is the same as that used for the motor current because operation of the LCI as a diode bridge draws pure real power from the motor and, thus, corresponds to operating the motor as a generator. Thus, the normal operating range of the LCI for $\alpha=0$ to $\alpha=$slightly less than 180° is most of the right half of the vector diagram in FIG. 3. It is apparent from FIG. 3 why it is said that the LCI is not suitable for supplying an induction motor since there is no region of operation of the LCI which includes the operation region of the induction motor. The exciting current component $I_{LE}$ furnished by the LCI is of a demagnetizing polarity.

As was earlier indicated and as will become more apparent as this description proceeds, the total system of the present invention is regarded as having three sources of current. The first of these sources $I_L$ comes from the LCI. The second source is a current $I_C$ which comes from the capacitor circuit 32, FIG. 1, while the third current $I_X$ comes from the variable VAR generator 40. Each of these currents will be restricted by the characteristics of its source to its specific region in FIG. 3 and the sum of these three currents must equal the total motor current.

The current $I_C$ of the capacitor circuit is shown in FIG. 3 as being horizontal to the left, the phase angle which builds flux. The angle of current of a forced commutated inverter which is connected to a source of electrical power could be at any value. It is a function of the forced commutated inverter to allow the VAR generator current $I_X$ to be switched at any time and thus be at any vector position. In the case of a VAR generator without a separate power source, which can neither accept nor deliver real power, its current must be horizontal in the diagram of FIG. 3 with the polarity to the left (capacitive) or right (inductive).

FIG. 4 shows how the currents of three sources can be combined to satisfy the requirements of an induction motor. The motor current $I_M$ is shown at the vector position representing motoring operation. The LCI current $I_L$ is shown as having a real component (vertical) equal to that of $I_M$ and at a vector position as close to that of the motor current as it can get (within the allowed region of LCI current). Capacitor circuit current $I_C$ is in its allowed vector position and has magnitude determined by the voltage and frequency of the motor and determined by the relationship:

$$I_C = V_M \omega C; \qquad (1)$$

wherein:
$V_M$ = motor line to neutral voltage;
$\omega$ = motor stator frequency;
C = effective line to neutral capacitance.

Capacitor current vector $I_C$ is shown in two places on the vector diagram in FIG. 4, once at the origin and once in vector summation with $I_L$ at the bottom of the diagram. The current $I_X$ from the VAR generator is directed horizontally and is controlled to have a magnitude and polarity to complete the vector diagram so the current needed by the motor at the torque required, $I_M$ is defined by the relationship:

$$I_M = I_L + I_C + I_X \qquad (2)$$

FIG. 4 was drawn for the case which occurs when the capacitor current is too small to provide the needed reactive current.

FIG. 5 shows the vector position for the various currents for the situation in whch the capacitor circuit is too large. In this situation, the control for the VAR generator 40 has caused it to reverse its phase position and adjust its amplitude so that the sum of the three currents just provides the required reactive current as before. Since the magnitude of the capacitor current is determined by expression (1) above, a function of the motor voltage and the motor speed, there is no way to directly control the magnitude of capacitor current. Thus the variable voltage VAR generator current will have to be adjusted at each operating point to make up the error in reactive current. The optimum selection for the capacitor circuit will, therefore, be that which minimizes the total requirements of the VAR controller.

Reference is now made to FIGS. 6 through 10 which show several possible schemes for providing circuit 39 of the variable VAR controller 40. In each case, the VAR controller illustrated is shown connected to lines 18, 20 and 22 for orientation purposes. It is to be understood that in each case the various switching or gating elements of the various controllers will be under the control of suitable control means, as will be explained, so that the amount of VARs provided in accordance with the capabilities of the several circuits may be varied.

Figure 6:
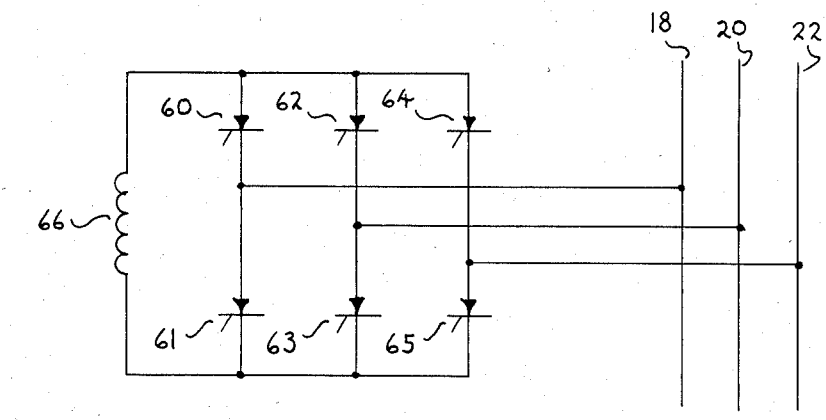

FIG. 6 illustrates a first possibility for the VAR generator circuit 39. That shown is what is commonly known as a line commutated converter comprised of six thyristors (60 thru 65) in a three phase, three leg arrangement. The connection to the motor by lines 18, 20 and 22 is made to the thyristor's junction within each of the three legs; i.e., between thyristors 60–61, 62–63 and 64–65. What is normally referred to as the DC conductors of the converter bridge are connected to a terminating impedance, inductor 66. The configuration of FIG. 6 can supply only lagging VARs and the amount of VARs it will supply is a function of the gating of the thyristors.

Figure 7:
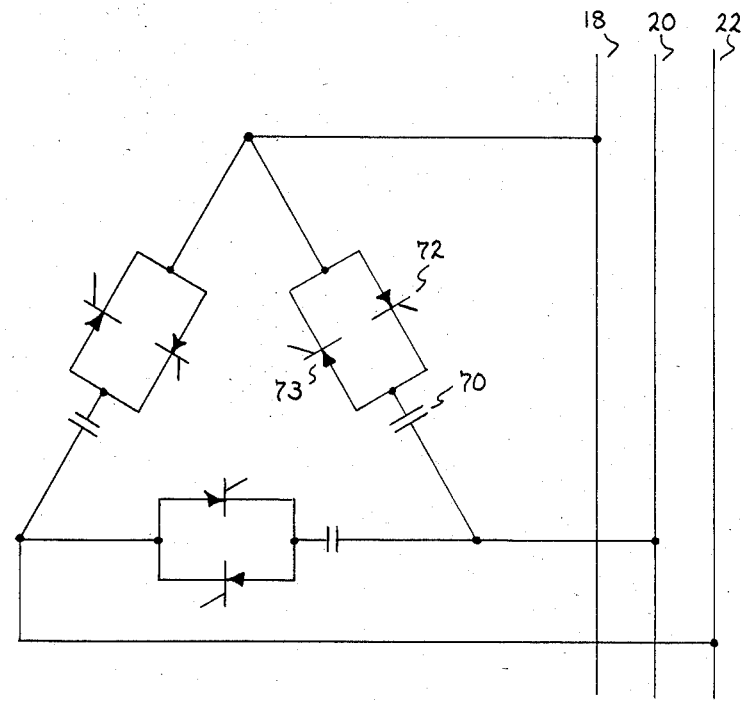

FIG. 7 shows as a possible VAR generator a switched capacitor circuit. It will be recognized that this generator can provide only leading VARs. As shown, the three lines 18, 20 and 22 are connected to a delta circuit arrangement, each leg of which includes, for example, a capacitor 70 connected in series arrangement with an anti-parallel scheme of gating elements such as thyristors 72 and 73. By the selective gating or rendering conductive of the various thyristors of legs of the delta arrangement, the bridge or the generator of FIG. 7 is capable of supplying variable leading VARs to the system.

Figure 10:
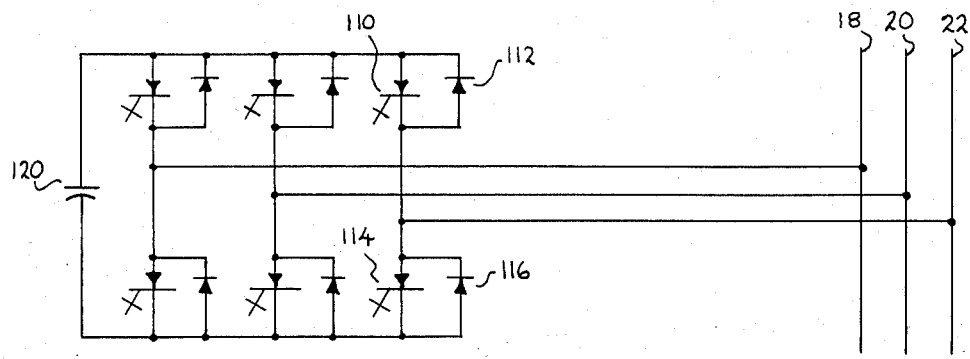

FIGS. 8, 9 and 10 depict various types of forced commutation converters which are capable of supplying both leading and lagging VARs. Such converters are normally considered more desirable for use in the present invention where motor operation over an extended range is desired. FIG. 8 illustrates what is commonly referred to as a controlled current or autosequentially commutated inverter. Each of the three legs of this three phase version is comprised of a series arrangement of, for example, a first thyristor 74, a first diode 75, a second diode 76 and a second thyristor 77, all poled to conduct in the same direction. Connected between the thyristors of adjacent legs are commutating capacitors, for example, capacitors 78 and 79. This bridge arrangement, similarly to that shown in FIG. 3, is terminated in an inductive reactance 80.

FIG. 8 illustrates a further feature which is included only for purposes of completeness. The VAR generator of this configuration is shown connnected to the lines 18, 20 and 22 by means of a suitable isolation transformer 82 which has a wye connected primary 84 and delta connected secondary 86. This is included merely to recognize that in certain instances, isolation and/or voltage level adjustment may be required in accordance with good design practices and it is intended to represent one alternative form of connection which is applicable to all of the various embodiments.

FIG. 9 illustrates a second type of forced commutation inverter sometimes called the McMurray inverter. This circuit and its operation are explained in greater detail in the U.S. Pat. No. 3,207,974 entitled "Inverter Circuits" issued Sept. 21, 1965. This inverter, also shown in its three phase version is comprised of three identical sections and only that directly associated with line 18 will be described. It is seen that the inverter leg includes, between the DC buses, a first thyristor 86 in series connection with a second thyristor 88. These two thyristors are normally called the power thyristors. Connected, respectively, in parallel with the thyristors 86 and 88 and poled oppositely thereto, are a pair of diodes 90 and 92. Two additional thyristors, 94 and 96, normally referred to as the commutating thyristors, are connected between the DC buses while a capacitor 98 and inductor 100 are series connected between the cathode of thyristor 94 and the anode and cathode, respectively, of the diode 90 and the thyristor 86. By the proper gating of the several thyristors, capacitor 98 is appropriately charged and discharged to provide commutation of the leg thyristors in a manner well known and explained in the aforementioned patent. This forced commutation inverter is terminated on its DC terminals in a capacitor 102.

FIG. 10 shows still another version of forced commutation type inverter. This inverter is commonly referred to as a gate turnoff inverter and may be operated, for example, in a pulse width modulated or square wave mode. A symmetrical three phase version is again depicted which includes in one leg a first gate turnoff switch 110 which has connected in an anti-parallel fashion therewith a diode 112. In a similar fashion, the negative portion of the leg includes a gate turnoff switch 114 having connected in anti-parallel therewith a diode 116. This inverter is shown terminated on its DC terminals in a capacitor 120.

In the description which follows, signal designations followed by an * denote command signals specifying a desired or commanded value to be achieved while a designation without the * denotes a measured or calculated value. For example, the designation $I_L{}^*$ is indicative of a desired level of LCI output current while the designation $I_L$ refers to the actual LCI output current.

Figure 11:
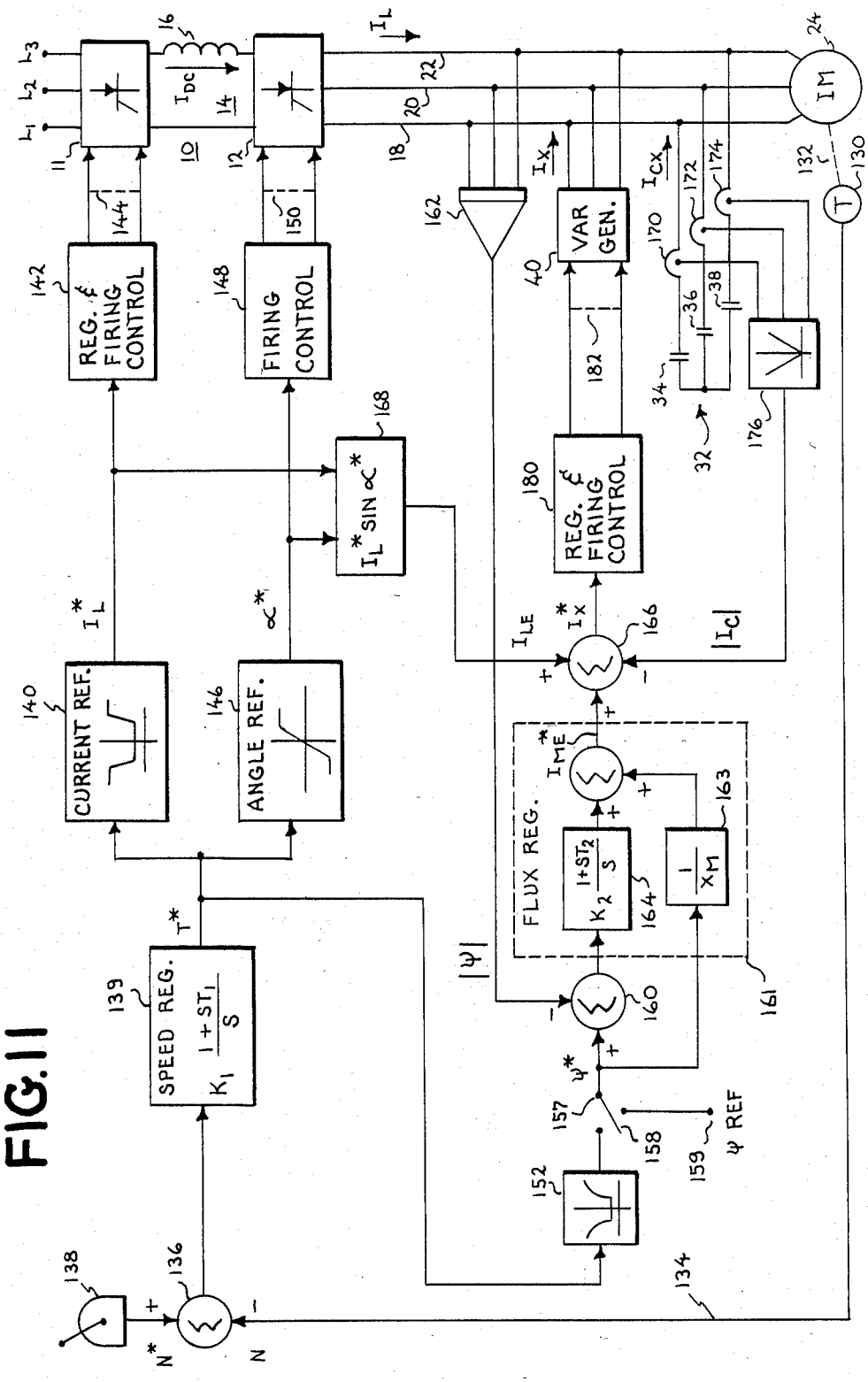
FIG. 11 is a schematic diagram illustrating the present invention in its total basic control aspects.

Reference is now made to FIG. 11 which shows the system of the present invention in a fundamental form. Included is the power portion as illustrated in FIG. 1 along with an associated control. As such, the source side converter 11 is connected to a source of three phase AC electrical power represented by the terminals $L_1$, $L_2$ and $L_3$. Further, the source side converter 11 is connected to the load side converter 12 by means of a DC link 14 including an inductor 16. Induction motor 24 is connected to the load side converter 12 by means of the conductors 18, 20 and 22. Capacitor circuit 32 comprised of capacitors 34, 36 and 38 is connected across the windings of the motor 24 through lines 18, 20 and 22. VAR generator 40 is again shown connected in parallel with the capacitor circuit 32 across the motor windings.

Three feedback control paths, responsive to a motor operation command signal, are associated with the power circuitry illustrated and serve to control, respectively, the source side converter 11, the load side inverter 12 and the VAR generator 40. In this regard, there is first provided a feedback signal which, in accordance with a preferred embodiment in the present invention, is proportional to the actual speed of the motor. This signal could be representative of the stator frequency, ω, as will be hereinafter described, but as here illustrated is a signal N derived from a tachometer 130, shown as being connected to the motor 24 by dashed line 132. Tachometer 130 provides an output signal N on line 134 proportional to the actual speed of the motor. This speed signal N is summed in a summing junction 136 with a signal N* which is representative of the desired speed of the motor and is derived from some suitable means such as an operator control 138. The difference between the N and the N* signal as determined by the junction 136 is provided to a speed regulator circuit 139 which may have a transfer function $$K_1 \frac{1 + ST_1}{S}.$$

The output of circuit 139 is the motor operation command signal which is here designated T*, a torque command signal. The T* signal is applied to each of the three feedback control paths. Looking first at the upper control path which controls the firing of the thyristors in the source side converter, it is seen that the T* signal is applied to a current reference 140 which is, essentially, an absolute value circuit with a lower limit to provide as an output therefrom a signal $I_L{}^*$. This latter signal serves as a command input to a regulating and firing control circuit 142 which, in turn, provides output signals on lines 144 to control the thyristor firing of the thyristors of the converter 11. In a similar manner the T* signal is applied to an angle reference 146, basically a linear amplifier having limits, which provides an output signal α*. The α* signal serves as a command input to a firing control circuit 148 whose output signals on lines 150 control the firing of the thyristors of the load side converter 12. The control of these upper two paths for the controllers of the load and source side converters is that which is well known in the art. For a further and more complete description thereof, reference is made to U.S. Pat. No. 4,449,087 issued May 15, 1984 to David L. Lippitt et al. entitled "Flux Feedback Firing Control for a Load Commutated Inverter", which patent is specifically incorporated hereinto by reference.

The third feedback path is the one with which the present invention is primarily concerned. This path controls the operation of the VAR generator 40 in response to a flux command signal ψ* representative of the desired level of motor flux. In FIG. 11, two methods of producing the ψ* signal, at circuit node 157 associated with a switch 158, are shown. The first of these is to supply a reference signal, ψ reference, of predetermined value to an input terminal 159 such that, when the switch 158 is in its lower position, this signal appears at node 157 and serves as the ψ* signal. The second method takes as an input the T* signal from the speed regulator 139 and, in a function block 152 develops the ψ* signal which will appear at node 157 when switch is in its upper position. Function block 152 is illustrated as an absolute value circuit having a non-linear gain and limits. The ψ* signal is applied through two paths to establish a command for motor exciting current $I_{ME}{}^*$. The two paths together form a flux regulator 161. The first path is a feed-forward path through block 163. As a first approximation the exciting current command $I_{ME}{}^*$ is set by this path to the ratio of flux command to motor exciting reactance, $X_M$. The second path is a feedback path through block 164 where the ψ* signal is applied to a summing junction 160 as one input, the second input of which is a signal |ψ| representative of the absolute value of actual motor flux. The generation of the |ψ| signal may vary as, for example, by being derived from flux coils associated with the motor. In the illustrated embodiment, however, the |ψ| signal is developed by circuit 162 which integrates the motor terminal voltages and determines the sum of the absolute value of the integrals to develop a signal indicative of the actual flux. (A more complete showing of this latter method of developing a |ψ| signal may be found in FIG. 14.)

The difference between the ψ* and |ψ| signals, taken from junction 160, is applied to a block 164 which which may have essentially the same type transfer function as speed regulator 139. This function may be expressed as:

$$K_2 \frac{1 + ST_2}{S}.$$

The output of the flux regulator is a command signal $I_{ME}{}^*$ proportional to the desired level of the exciting component of the motor current to provide proper motor operation. This component will be in phase with the air gap flux as shown in FIG. 3. The $I_{ME}{}^*$ signal is applied as one input to a three input summing junction 166 the second input to which is a signal designated $I_{LE}$. This latter signal is the output of a function block 168 which essentially provides a product of signal $I_L{}^*$ from current regulator 140 and the sine α* command from the angle regulator 146. This $I_{LE}$ represents the reactive current required by the load commutated inverter circuit (reference FIG. 3). The third input to the summing junction 166 is a signal $|I_C|$ which is proportional to the absolute magnitude of the current furnished to the system by the capacitor circuit 32. This current signal can be derived in any appropriate manner such as being calculated as is later herein discussed. Alternatively, as depicted in FIG. 11, this signal may be developed from sensed values as by the use of three current transformers 170, 172 and 174 which sense the currents in the lines connecting the capacitor circuit 32 to the motor. The sensor outputs are connected to a function block 176 which determines the absolute values of the individual capacitor currents and sums those values to provide, as its output, the $|I_C|$ current signal.

The output of junction 166 is $I_X^*$, the command for VAR generator current. It is applied to a regulator and firing control 180 which provides on lines 182 the signals for controlling the gating of the VAR generator 40 to provide appropriate VAR correction in the manner earlier described. That is, by the value of the signal from line 166 the VAR generator is controlled to adjust the time (phase angle) of firing of the thyristors or gates of the appropriate VAR generator to control the exciting current $I_X$ (the VARs).

It should be noted at this point that a consistent inclusion for the present invention is the control of the VAR generation as a function of the motor flux. As such, although not shown specifically in the drawing, an operational control can be made by connecting the output of the flux regulator directly to the regulator and firing control 180 with the omission of the feedback signals $I_{LE}$ and $|I_C|$. The problem with this simpler system is that it suffers from a positive feedback effect of the capacitor circuit 32 on the motor excitation. This feedback effect can be explained intuitively by observing that the current from the capacitor circuit 32, which causes the motor flux, is directly related to the motor voltage as shown in the expression of equation (1) above. As such, any increase in the motor voltage will cause an increase in the capacitor current which is an increase in the motor exciting current. In turn, this increase in exciting motor current will cause an increase in flux; and hence, a further increase in motor voltage. Thus, that created is a positive feedback which tends to compound itself resulting in a possible condition of instability. It can be shown from a model of the motor 24 and the capacitor circuit 32 connected in the manner illustrated, that the positive feedback loop for the motor exciting current $I_{ME}$ has an overall gain given by the expression:

$$I_C/I_{ME} = L_M \cdot \omega_1 \cdot \omega_1 \cdot C \frac{1 + St_1}{1 + St_2} ; \quad (3)$$

wherein:
$L_M$ is the equivalent magnetizing inductance of the motor;
$\omega_1$ is stator frequency proportional to motor speed plus slip;
C is the effective capacitance of the capacitor circuit 32;
S is the LaPlace transform operator;
$t_2$ is a time constant typically having a value of approximately 1 second; and,
$t_1$ is a time constant typically shorter than $t_2$.

From the foregoing expression, it is seen that the positive feedback is proportional to the speed squared.

As such, at low speeds the effect of this loop will not be important and in the absence of control, the motor will have no excitation. At a specific speed, typically in the range of 0.5 per unit, the overall loop gain will reach unity. This is the speed for self-excitation of the motor by the capacitor circuit. At higher speeds, the positive feedback will cause the motor to be excited to saturation level. At lower speeds the flux would collapse in the absence of the VAR generator.

The $I_{LE}$ and $|I_C|$ signals are, therefore included in FIG. 11 to decouple this positive feedback effect and to develop a signal $I_X^*$ representing the amount of current required from the VAR generator to develop the commanded motor exciting current; i.e., the magnitude of the exciting component, $I_{ME}$, of the motor current. Any change which occurs in any of the factors which determine the exciting component of the motor current will cause a change in motor flux delayed by the motor excitation time constant $t_2$. Thus, by the inclusion of the $I_{LE}$ and $|I_C|$ feedback signals, the change in exciting component of the current is detected and a correction is made before the motor flux can change significantly and the positive feedback loop as described above is broken. Since the time constant $t_2$ is in the order of one second, the control loop must therefore be fast with respect to approximately one radian per second. This is a very modest requirement in the present state of the art.

Figure 12:
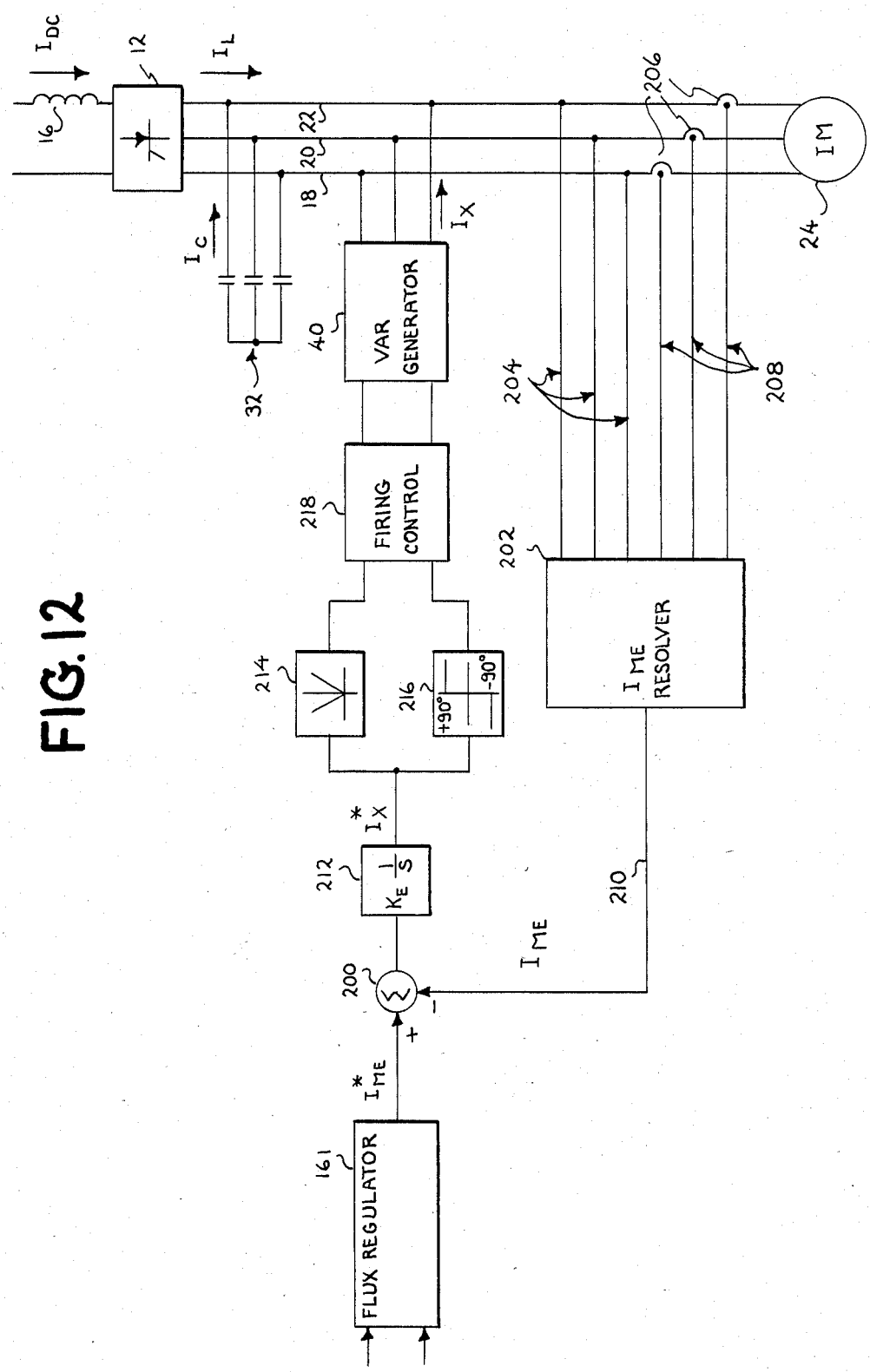
FIG. 12 is a schematic diagram illustrating a preferred embodiment of the control of the variable VAR generator of a system of the present invention.

Reference is now made to FIG. 12 which illustrates a further embodiment of the present invention in an alternative form. FIG. 12 is a system of the same general type as depicted in FIG. 11. As such FIG. 12 duplicates those parts of FIG. 11 which are common only to the extent of providing proper orientation. It is to be expressly understood that the control of the load commutated inverter, that is, the converters 11 and 12 may be in the same manner as was earlier described. The difference in FIG. 12 over FIG. 11 lies in the control of the VAR generator 40.

Referencing specifically now FIG. 12, shown are the load side converter 12, the DC link inductor 16, lines 18, 20, and 22, the induction motor 24, and capacitor circuit 32. VAR generator, 40 preferably of the forced commutation type, again supplies a variable exciting current $I_X$ to the lines 18, 20 and 22 and hence to the motor 24. In a manner similar to that described with respect to FIG. 11, a flux regulator 161 is provided to give an output command signal $I_{ME}^*$ as an input to a summing junction 200. The second input to summing junction 200 is a signal designated $I_{ME}$ on line 210 which is derived from an $I_{ME}$ resolver 202. Resolver 202, possible embodiments of which will be later described, receives signals via lines 204 representing the terminal voltage of the motor 24. Resolver 202 also receives, via suitable sensing elements such as current transformers 206 and lines 208, signals repesenting the phase currents which are supplied to the motor. The $I_{ME}$ output of the resolver 202 on line 210 represents the magnitude of the actual motor exciting current.

The output of summing junction 200 which represents the difference between the desired level of motor excitation and the actual level of motor excitation is applied to a simple integrating function (block 212) the output of which is a signal $I_X^*$ indicative of the amount of exciting current that the VAR generator 40 must produce in order to provide proper excitation of the motor. This $I_X^*$ signal is applied to two function blocks which constitute the regulator portion of the regulator and firing control 180 in FIG. 2. This separation of the regulation portion demonstrates a more generic form of regulation and control which is also suitable for use when the VAR generator is supplied with a separate source of power such as that shown by the dashed line 42 in FIG. 1. The $I_X^*$ signal is applied to function block 214 which is essentially an absolute value circuit which in turn provides, to firing control 218, a signal to govern the magnitude of the output of the VAR generator 40. The sense (polarity) of the output of VAR generator is determined by the output of function block 216 which provides an output representing either $+90°$ or $-90°$ dependent solely upon the polarity of the $I_X^*$ signal. The signals from the two blocks 214 and 216 are applied to a firing control 218 which in response thereto controls the firing angle of the VAR generator thyristors. Thus, the VAR generator output is regulated as a function of the actual exciting current $I_{ME}$ of the motor.

Since the $I_{ME}$ control loop as shown in FIG. 12 does not contain any internal motor parameters except the small effect of motor leakage reactance, speed of response is limited only by the VAR generator itself. It is easy, therefore, to select a gain constant $K_E$ in block 212 which implements a fast stable loop to maintain the level of excitation current in motor as desired. Essentially, an advantage of this control loop to regulate the motor exciting current is that it breaks the positive feedback loop by correcting errors in the excitation before they become errors in flux. This circuit also tends to linearize the flux loop.

In an embodiment previously noted but not shown, the output of the flux loop was regarded as the current command for the VAR generator. Flux, however, is not directly proportional to the exciting current of the VAR generator but is proportional to the total exciting current of the motor (with the proportionality determined by magnetic saturation). Thus, when the output of the flux regulator is regarded as a command $I_X$ to the VAR control 40, the control is not linear. But when the output of the flux loop is regarded as a command for motor excitation current $I_{ME}^*$, and that excitation current is measured for feedback, (as in FIG. 12) and the error is regarded as $I_X^*$, then the flux control is linearized. Similarly, when the flux loop output is regarded as a motor excitation current command $I_{ME}^*$, and a command for $I_X^*$ is generated by correcting for all other components of $I_{ME}$ as in FIG. 11 and regarding the remaining portion of $I_{ME}^*$ as a command $I_X^*$ to the VAR controller, then the flux loop is linearized. These loops of FIG. 11 or FIG. 12 also reduce the forcing or dynamic range required of the variable VAR generator 40. When any change occurs, for example, a change in the excitation component of the motor current from the LCI, the motor flux will begin to change on its one second time constant. If the change is not corrected immediately, but rather is allowed to remain until the change in motor flux can be sensed by the flux loop, then correcting this flux error will require correction to three components of the motor excitation current. The first component required for correction is the change in the total motor excitation current, $I_{ME}$. The second component required for correction is for the capacitor current which changed because the flux was allowed to change. The third component is to provide some transient forcing current to restore the flux level at a satisfactory rate. Since the sense of three components will usually be the same, they will combine to determine the dynamic range requirements of the VAR generator. If all errors are sensed as $I_{ME}$ errors; i.e., motor excitation current errors, and the excitation current is corrected before the flux can change, then the only change that need to be compensated for is the exciting current disturbance.

Figure 13:
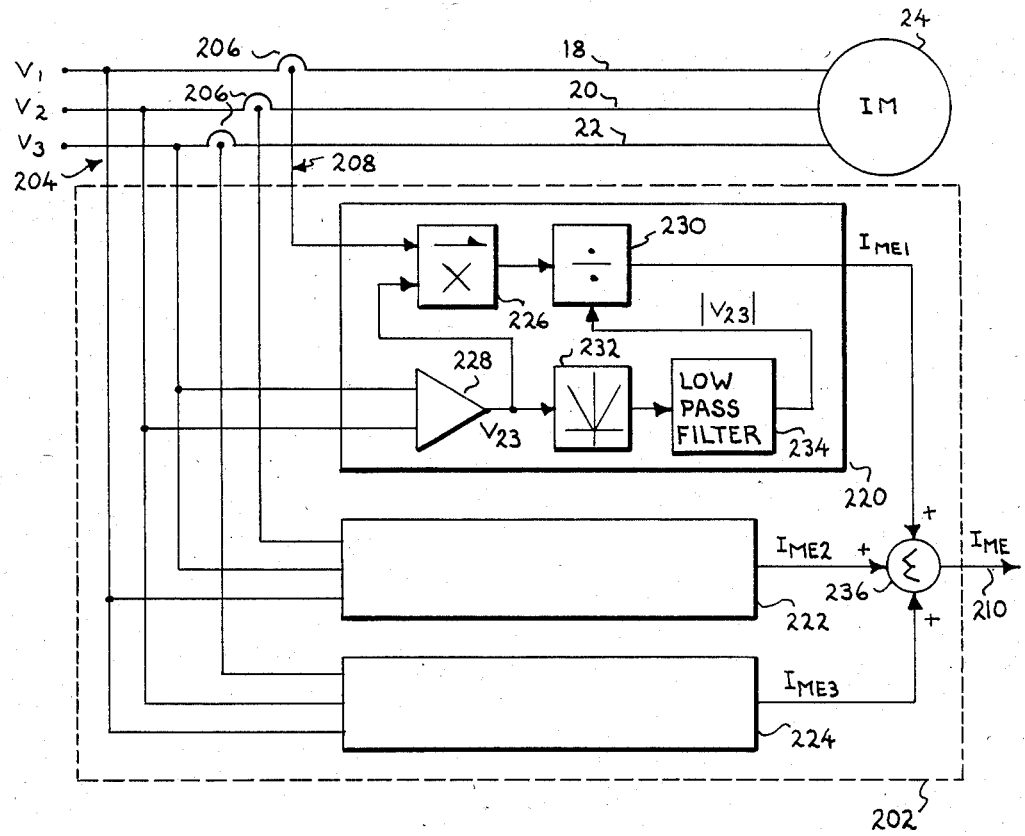
FIGS. 13 and 14 are detailed schematic diagrams illustrating possible implementations of a portion of the system of FIG. 12 shown therein in block form.

Reference is now made to FIG. 13 which shows one possible implementation of the $I_{ME}$ resolver 202 of FIG. 12. Resolver 202 is comprised of three individual phase components 220, 222 and 224 which respectively develop phase exciting currents $I_{ME1}$, $I_{ME2}$ and $I_{ME3}$. Since each of the components 220, 222 and 224 is essentially identical except with respect to its connection in the overall system, only that designated as 220 will be explained in detail.

FIG. 13 implements, in each phase, the expression:

$$I_{ME1} = \frac{\vec{I_1} \times \vec{V_1}}{|\vec{V_1}|} = \frac{\vec{I_1} \cdot (\vec{V_2} - \vec{V_3})}{(\vec{V_2} - \vec{V_3})} \tag{4}$$

where both · and x represent vector multiplications and the second equality is valid only for balanced three-phase systems.

Referencing now the phase component 220, it is seen that a signal proportional to the current in the first phase, phase 1, is provided from a sensor 206 to a suitable vector multiplier 226. Voltage signals, via lines 204 from phase 2 and phase 3 of the motor 24, are furnished to a differential amplifier 228. The output of amplifier 228 is equal to the phase-to-phase voltage $V_{23}$. This latter signal is applied as a second input to the multiplier 226 the output of which is the vector product of the phase-to-phase voltage and the phase current. This output is supplied to a divider 230. The output of amplifier 228 is also applied to an absolute value circuit 232 the output of which is applied to a low pass filter 234 such that the output of that filter is a signal proportional to the absolute magnitude of the signal $V_{23}$. This latter signal is applied to the second input of the divider 230. The output of the divider 230 is, therefore, a signal which is proportional to the motor exciting current with respect to phase 1 ($I_{ME1}$). The $I_{ME1}$ signal is applied as one input to a summing junction 236. Components 222 and 224 are similarly connected to the currents in phases 2 and 3 and the various phase voltages and, in a like manner, provide outputs respectively designated $I_{ME2}$ and $I_{ME3}$ which form additional inputs to the summing junction 236. The output of summing junction 236, on line 210, is the signal $I_{ME}$ as shown in FIG. 12.

Figure 14:
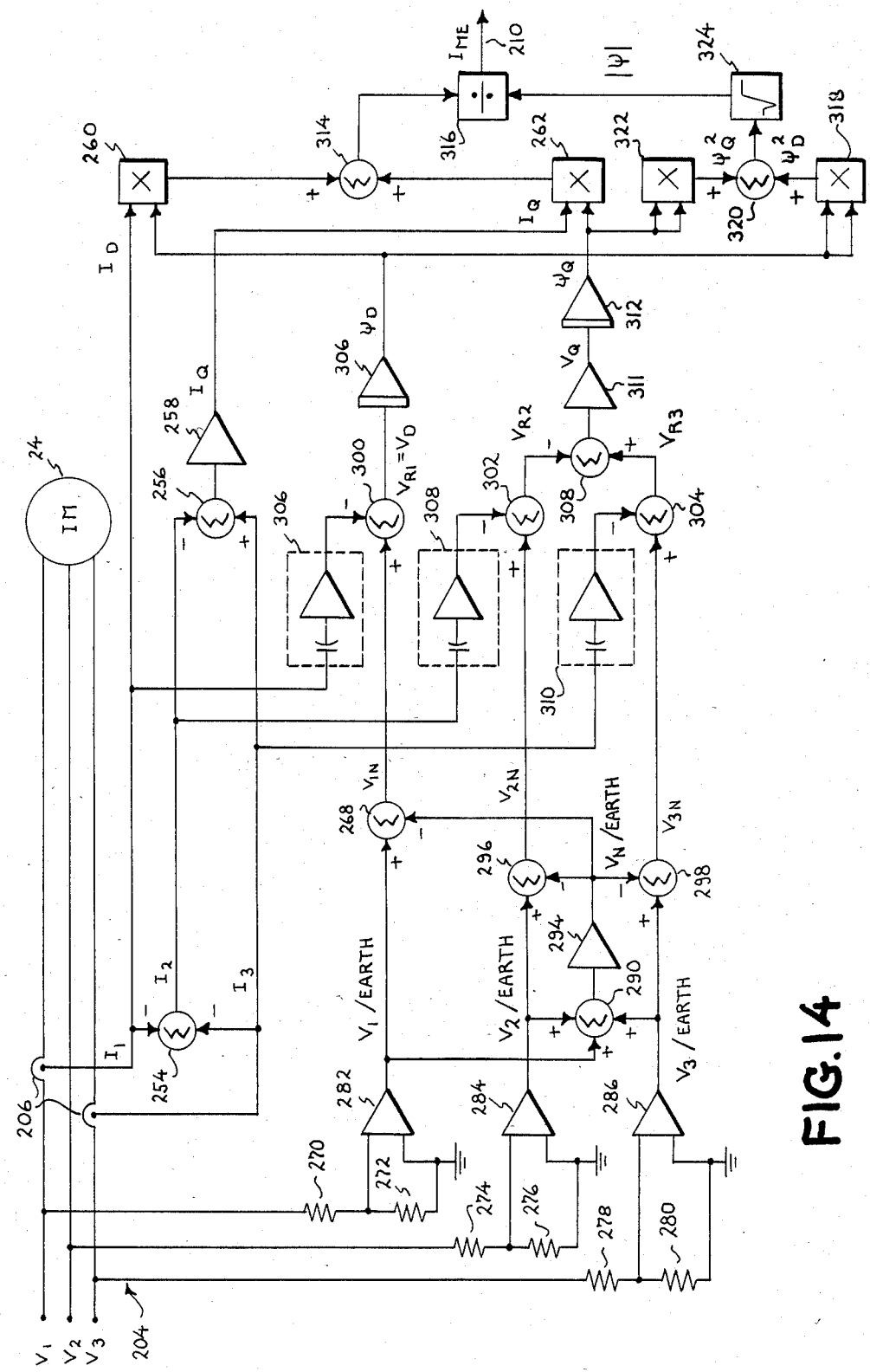

FIG. 14 illustrates an $I_{ME}$ resolver which provides substantial improvements over the relatively simple system of FIG. 13 with the tradeoff of additional required circuitry. This embodiment uses information from all three phases to derive a ripple-free measure of $I_{ME}$ related to air gap voltage rather than terminal voltage. The resolver of FIG. 14 implements the following definition of motor exciting current magnitude:

$$I_{ME} = \frac{\vec{\psi_D} \cdot \vec{I_D} + \vec{\psi_Q} \cdot \vec{I_Q}}{|\psi|}. \tag{5}$$

With reference now to FIG. 14, it is seen that a signal, $I_1$ representing the current in phase 1 is derived by a sensor 206 and serves as one input to a summing junction 254. The other input to summing junction 254 is derived from a sensor 206 in phase 3 of the system to provide a signal I₃. The output of the summing junction at 254 is, therefore, the value of the current in the other phase, I₂. In FIG. 14, the I₁ signal is also designated $I_D$ which is translated as the direct axis current; that is, a current which is considered to be in phase with the flux. This current signal serves as one input to a multiplier 260. The I₂ and I₃ signals are summed in junction 256 and the output of this junction is applied to an amplifier 258 having a gain of 0.577. The output of that amplifier is a signal representing the quadrature axis current $I_Q$ which serves as one input to a multiplier 262.

The two multipliers 260 and 262 have as their second input flux signals designated respectively $\psi_D$ and $\psi_Q$ which represent the direct axis and quadrature axis flux components of the motor. These flux signals $\psi_D$ and $\psi_Q$ are developed as follows. Each of the phase voltages is applied to a differential amplifier by way of a voltage divider to provide at its output a signal with respect to earth. That is, the phase voltage V₁ is supplied by way of a voltage divider including resistors 270 and 272 connected between phase 1 and ground with the midpoint of the voltage divider being furnished as one input to differential amplifier 282. In a similar manner, the voltage V₂ is applied via resistors 274 and 276 as an input to amplifier 284 while the phase voltage V₃ is applied via voltage divider having resistors 278 and 280 to a differential amplifier 286. The second input to each of the amplifiers 282, 284 and 286 is connected to earth. The outputs of the three amplifiers 282, 284 and 286 are, therefore, respectively signals representing the phase voltages with respect to earth. Each of these signals serves as an input to a summing junction 290 wherein they are summed and this sum is applied to an amplifier 294 having a gain of 0.333. The output of amplifier 294, at node 292, represents the neutral-to-earth voltage. This signal at node 292 is then combined with each of the voltage with respect to earth signals to develop a phase voltage with respect to neutral signal. That is, the output of amplifier 282 is combined in a summing junction 268 with the voltage at node 292 to provide a representation of the voltage of phase 1 with respect to neutral ($V_{1N}$). In a like manner, the outputs of amplifiers 284 and 286 are combined, respectively, in summing junctions 296 and 298 with the signal at node 292 to provide a phase to neutral voltage signals $V_{2N}$ and $V_{3N}$. The outputs of the summing junctions 268, 296 and 298 are applied, respectively, as inputs to three summing junctions 300, 302 and 304. The second inputs to these latter three summing junctions are signals proportional to the motor leakage inductance voltage due to motor currents; i.e., the L di/dt. Thus, the second input to junction 300 is the output of a differentiating circuit 306 which receives as its input the I₁ signal. In a similar manner, a differentiating circuit 308 connected to the I₂ signal, provides the L di/dt signal for phase 2 while similar differentiating circuit 310 connected to the I₃ signal provides a similar signal to summing junction 304.

The outputs of three summing junctions 300, 302 and 304 are representative of the reconstructed air gap voltages of the motor and are designated respectively $V_{R1}$, $V_{R2}$ and $V_{R3}$. The $V_{R1}$ signal from summing junction 300 (the direct component of the motor voltage) forms the input to an integrating circuit 306, the output of which represents the direct axis component of the motor flux $\psi_D$. This $\psi_D$ signal forms the second input to the multiplier 260. The $V_{R2}$ and $V_{R3}$ signals are applied to a summing junction 308 the output of which is multiplied in an amplifier 311 having a gain of 0.577, which provides at its output a signal representing the quadrature value of the motor voltage $V_Q$. This signal is applied to an additional integrating circuit 312 the output of which represents the quadrature axis value of the motor flux $\psi_Q$. This $\psi_Q$ signal forms the second input to the multiplier 262. The outputs of the multipliers 260 and 262 are applied to a summing junction 314, the output of which, serves as one input to a dividing function 316.

The second input to the divider 316 is a signal proportional to the absolute magnitude of the motor flux, ($|\psi|$). This signal is derived, in FIG. 14, by first supplying the $\psi_D$ signal from integrator 306 as both inputs to a multiplier 318. The output of this multiplier will, therefore, be the square of the direct flux component $\psi_D^2$. In a similar manner, the $\psi_Q$ signal forms both inputs to a second multiplier 322 whose output is equal to the square of the quadrature flux $\psi_Q^2$ and forms a second input to the summing junction 320. The output of the summing junction 320 is provided to a square root function block 324 the output of which is the second input to the divider 316. This input, as was previously noted, is a signal proportional to the absolute magnitude of the motor flux ($|\psi|$). The output of the divider 316 is the $I_{ME}$ current which in context of FIG. 12 is supplied on line 210 to the summing junction 200. The FIG. 14 embodiment enjoys the following advantages over that of FIG. 13. First of all, only two phase currents are sensed with the third phase current being and derived by the circuitry. The phase voltages are reconstructed to air gap voltages in the manner indicated. The system is simplified by the conversion of both current and voltage signals from a three phase base to the familiar two phase direct and quadrature axis system. In addition, the reconstructed air gap voltages are integrated to get the air gap fluxes which integration tends to remove harmonics of the voltage and, thus, make the instantaneous multiplications more validly vector multiplications. Finally, the magnitude of the flux is derived in ripple-free manner using the square root of the sum of the square rather than absolute magnitude functions.

The description thus far is to a motor drive and control in which the motor flux level is described as being inherently unstable such that, in the absence of an active control, the flux will go either to saturation or to zero. Control of that flux has been by controlling the current output of the VAR generator and thus it is apparent that if the current command by the system ever exceeded the capability of that generator in either direction, the flux would go to its limit value and the drive would have to be shut down. For example, if the VAR generator is aiding the capacitor to support the flux and the motor requires more excitation than is available from the sum of the capacitor and the VAR generator currents, then the flux will begin to decrease. This decrease will reduce the available capacitor current (due to the motor voltage decrease) and will further cause an increase in the current from the load commutated inverter circuit to maintain torque which will further reduce the available excitation current. This assures the total collapse of the flux.

A further runaway condition occurs if the VAR generator reaches its current limit capability when it is operating in the mode of an inductor and hence cancelling available capacitor current which is in excess of the extant need for exciting current. In this situation when the VAR generator can no longer increase its current, a slight increase in flux will cause an increase in the capacitor current, thus, increasing excitation. The higher flux will also cause the load commutated inverter circuit current to decrease (to provide the same torque) further increasing the available exciting current. The flux will thus increase regeneratively until motor saturation can consume all of the exciting current. If the motor speed is near rated, the saturation level of the flux is likely to produce a motor voltage higher than the inverters can withstand and it will be necessary to shut the drive down in order to avoid damage.

One way of alleviating the above problems is to make the VAR generator of sufficient capacity so that under no circumstance can the current limit be reached, even on transients. While possible, this is an obviously uneconomical solution.

The approach which will now be described is to pass the control of the motor excitation to the load commutated inverter circuit when the VAR generator runs out of range. In this regard, in the ensuing discussion, it will be assumed that the VAR generator used is of any type which can make both leading and lagging VARs.

Figure 15A:
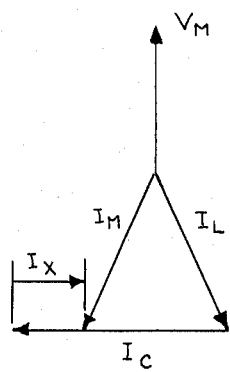
FIGS. 15A, 15B, 15C, 16A, 16B, 16C, 18 and 19 are vector diagrams helpful in the understanding to the showings of FIG. 17.
Figure 15B:
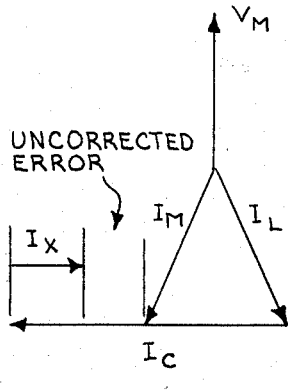
Figure 15C:
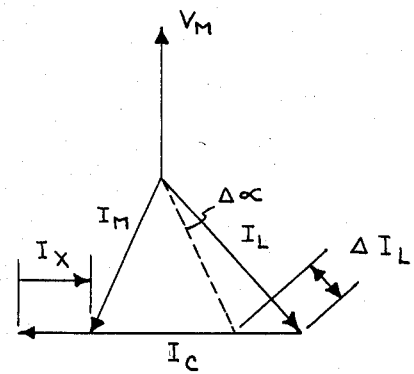

In this implementation, if the VAR generator is at its limit in the inductive mode of operation, the LCI is caused to move its load side angle toward $\alpha = 90°$ and to increase its current level in a coordinated manner which produces a controlled increase of the demagnetizing reactive current and no change in the torque. This system is illustrated in FIGS. 15A, 15B and 15C. These figures show vector diagrams of motor currents using conventions and terminology similar to those used with respect to FIGS. 3, 4 and 5.

FIG. 15A illustrates the case where the VAR generator output current, $I_X$, is at its limit value in the inductive direction but sufficient to offset excessive capacitor current, $I_C$. In this situation, total operation is at the end of the stable range.

FIG. 15B illustrates the effect of a small increase in speed with no change in torque. The capacitor current $I_C$ increases due to the speed increase and the VAR generator output current $I_X$ cannot increase to cancel the incremental $I_C$. The uncorrected error would cause the flux to begin to build toward saturation.

FIG. 15C shows the improvement of the presently being described embodiment, the implementation of which will be described with respect to FIG. 17. In FIG. 15C it is seen that the LCI load side converter angle is changed by a value $\Delta\alpha$ and the LCI current $I_L$ is increased by a value $\Delta I_L$. The net effect of this is that motor torque is maintained (the vertical component of $I_L$ is unchanged), and control of flux is maintained (the sum of all horizontal components matches the horizontal component of $I_M$).

The operation of the system in this instance, that is in the inductive limit case, is so satisfactory that it is possible and sometimes desirable to use this as a normal mode of motor system operation. That is, if the capacitor current is even slightly in excess of the net amount of excitation current needed, the VAR generator can be turned off or omitted and the drive operated on the load commutated inverter circuit alone.

Figure 16A:
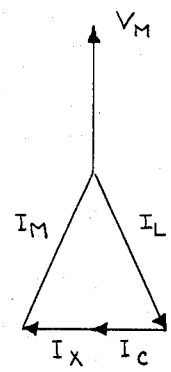
Figure 16B:
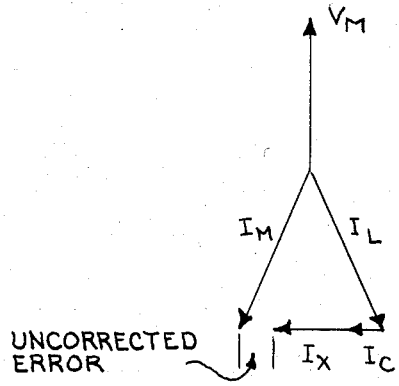
Figure 16C:
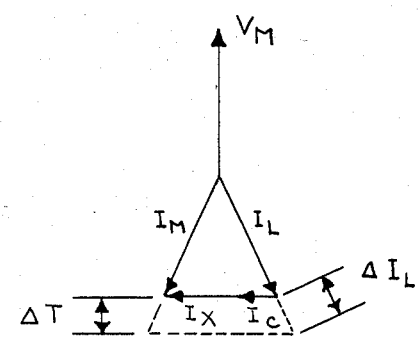

The situation in which the VAR generator is operating in capacitive current limit is illustrated by FIGS. 16A, 16B and 16C. In FIG. 16A, the available capacitor current is small and the VAR generator has increased its current in the capacitance sense until its current limit is reached. Once again in this situation the system is stable since the exciting current demands of the system are met.

FIG. 16B shows the effect of a slight decrease in the speed with no change in desired motor torque. Here the capacitor current $I_C$ decreases due to the decrease in frequency. The VAR generator current, $I_X$, cannot increase and the result is an uncorrected error as indicated. This deficit in excitation will begin to precipitate a collapse of flux.

FIG. 16C shows the effect of the present improvement. In this situation, the LCI current is decreased until the sum of the available capacitor current and the VAR generator current satisfies the motor excitation needs. No change is commanded in the LCI angle because the angle is normally already commanded to be of value which produces the least possible reactive current in the demagnetizing direction. The torque provided is decreased by the amount shown $\Delta T$. There is, in this case, no satisfactory way to meet the desired level of torque but, in most instances, it is deemed more satisfactory for the motor to slow down and run a slower speed due to reduced torque than for the flux to collapse producing no torque at all with a resultant system shutdown. The operating point at which the limitation of available VARs prevents delivering commanded torque will be reached whether or not a VAR generator is present. If the VAR generator is capable of providing leading VARs, more torque can be produced before this point is reached. This does, however, demonstrate that a workable system can be achieved in the absence of a VAR generator, albeit at a reduced torque level.

FIGS. 15A–15C and 16A–16C are believed to clearly demonstrate the desired mode of operation of this embodiment of the invention. An implementation to achieve these desired results is shown in FIG. 17. FIG. 17 is in the nature of the system as shown in FIG. 12 (which modifies FIG. 11) with certain exceptions. In FIG. 17, the output of the $I_{ME}$ regulator 212 is designated $I_E^*$ whereas in FIG. 12 this output was designated $I_X^*$, a signal which directly regulated the VAR generator. In FIG. 17, signal $I_E^*$ is applied to three new function blocks 400, 402, and 404, and is defined as an exciting current correction command proportional to the change in exciting current required by the motor 24.

Function block 400 provides a linear amplification function, limited in both directions, and the output of that block is the $I_X^*$ signal which applied to the two regulator functions 214 and 216 for control of the VAR generator in the manner previously stated. The limits on the output of block 400 are designed to coincide with the limits of the VAR generator. The $I_E^*$ signal also forms one input to function block 402 which provides an output signal only at the upper limit of the output of block 400. Thus, if the $I_E^*$ command signal exceeds the capability of the VAR generator in the capacitor direction, a spillover occurs through function block 402. This spillover is passed through a gain block 406 which serves to adjust the limits on a programmable limit circuit 408 to reduce the load commutator inverter circuit current to the extent necessary to reduce its demagnetizing effect as required by the $I_E^*$ signal. This is the action that is demonstrated in FIG. 16C. The gain of block 406 is set to provide the same excitation current effect from an increment of $I_E^*$ as would occur if the VAR generator could have responded to that increment. This keeps the crossover frequency of the total motor exciting current ($I_{ME}$) loop unchanged by the transfer from the VAR generator control of flux to the LCI circuit control of flux.

Limit circuit 408 has a feature which makes it immediately responsive to small signals from gain block 406. When the least signal appears at the output of the gain 406, the clamp or limit of block 408 is instantaneously lowered to the existing torque command signal T*. Thus, any further output from the block 406 will reduce signal $I_L^*$ from a current reference 140' in a linear fashion. Without this feature, small errors passed through block 406 would have no effect on the $I_L^*$ signal if that signal were not already near the maximum limit.

Figure 17:
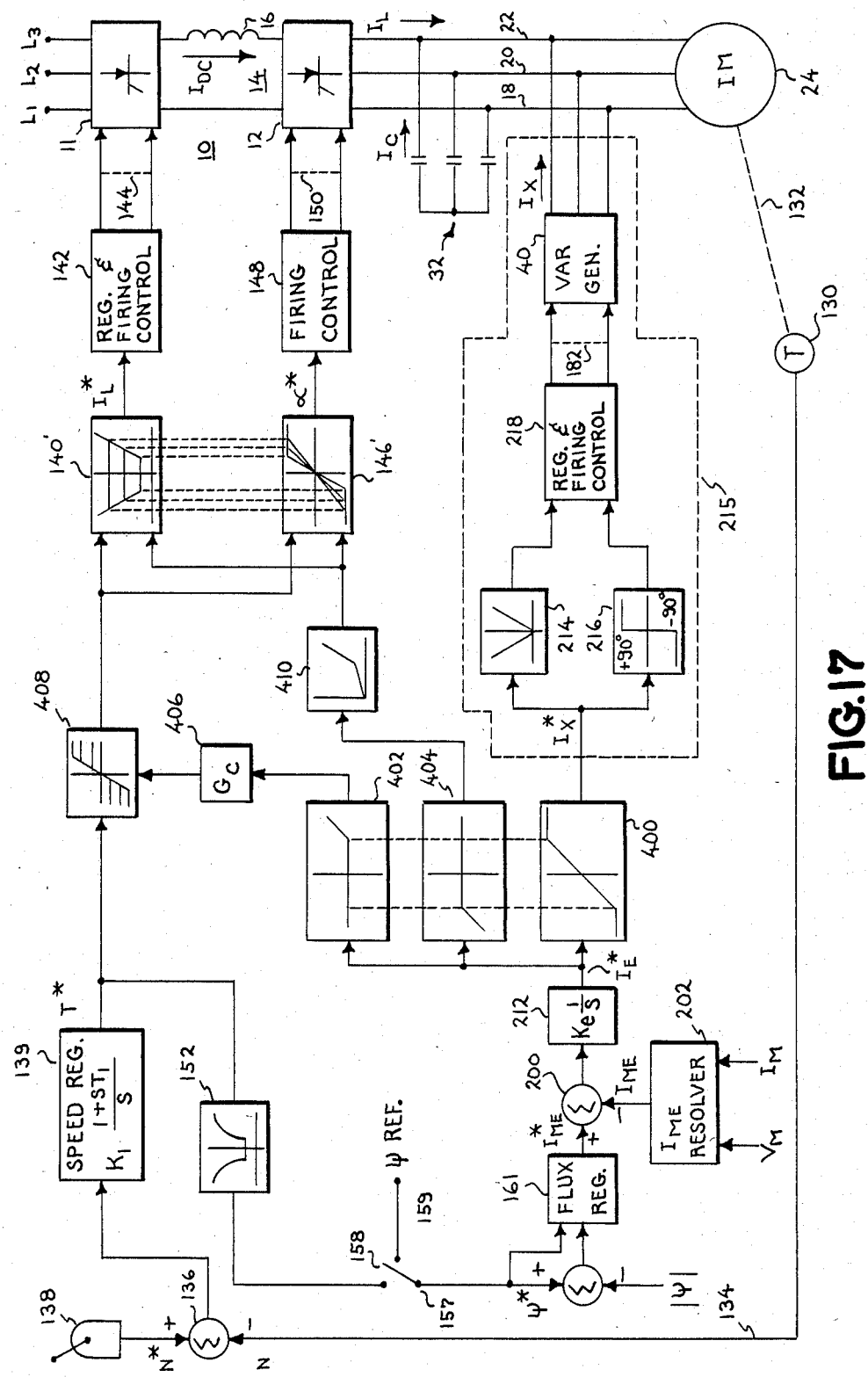
FIG. 17 is a major block diagram illustrating a further preferred embodiment of the present invention.

It should be noted at this point that the current reference block 140' and the angle reference block 146' as shown in FIG. 17 differ slightly from similar function blocks 140 and 146 shown in FIG. 11. In FIG. 11, the current reference, for example, had only one lower limit level whereas current reference 140' of FIG. 17 is seen to have a variable lower limit level. In a similar manner, the angle reference 146 as shown in FIG. 11 included only a single slope with limits while the angle reference 146' of FIG. 17 has multiple slopes. These changes are necessary to effect the appropriate action in accordance with the inductive limit. This is a function similar to that described in U.S. Pat. No. 4,446,414, "Terminal Voltage Limit Regulator for a Load Commutated Inverter" by L. C. Tupper, issued May 1, 1984, which patent is specifically incorporated hereinto by reference.

With respect now to the inductive limit feature, if the $I_E^*$ command signal exceeds the capability of the VAR generator in the inductive region, i.e., at the lower output limit of block 400, there is a spillover output from block 404 (an excess command) which is modified by non-linear gain block 410 whose output effects a change in the operation of the current reference 140' and the coordinated angle command reference 146'.

Figure 18:
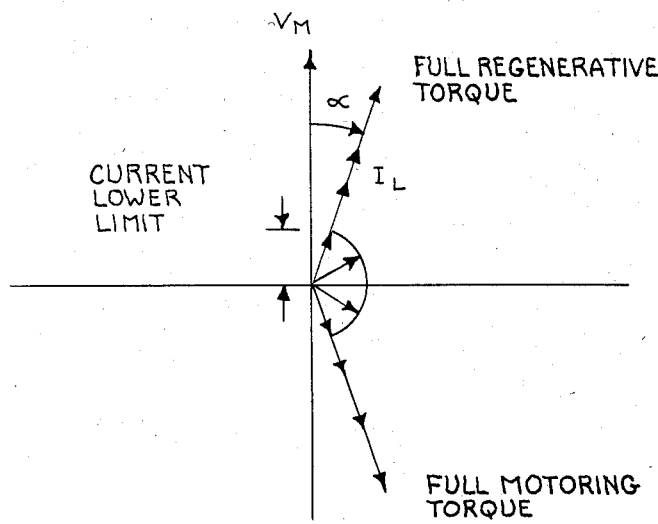

To properly understand the effect of the output of block 410 on blocks 140' and 146', it is necessary to first explain the "normal" operation of these latter two blocks. In "normal" operation, there is no spillover signal from function block 404 and hence no output from gain block 410. This causes the lower limit in the current reference 140' to be at its lowest level and the corresponding angle control of block 146' to have the steepest slope. In this situation the operation is identical to that explained with respect to FIGS. 11 and 12; that is, the current reference from 140' provides a current command to the load commutated inverter circuit which is linearly proportioned to the magnitude of the $I_L^*$ with a low minimum current as necessary to the function of the LCI circuit. The angle command generated by block 146' is either nearly full inversion ($\alpha = 180°$) or nearly full rectifying ($\alpha = 0°$), except when the torque command T* is near zero. As the torque command passes through zero, the angle command swings rapidly from one limit to the other for the current command output from the current reference 140' is at its minimum value. The locus of the vector $I_L$ as a function of the torque command signal T* is shown in FIG. 18.

The reason for this mode of operation is to provide the required torque from the LCI while observing the current lower limit and causing the minimum demagnetizing current. The component of LCI current which is reactive and is in the demagnetizing direction has an amplitude given by the expression:

$$I_{LE} = I_L \sin \alpha \tag{6}$$

The torque producing component of the LCI current is given by the expression:

$$I_{LT} = I_L \cos \alpha \tag{7}$$

The torque producing current $I_{LT}$ as defined above is the primary function of the LCI. The reactive current $I_{LE}$ is regarded as an undesirable in normal operations. It is for this reason that $\alpha$ is kept near zero or 180° where sin $\alpha$ is near zero and cos $\alpha$ is maximized. When $\alpha$ must be swung through the values having high values of sin $\alpha$ (near 90°) transverse is made at small current, that is, at the minimum value of the output of the current reference 140' to minimize the demagnetizing current $I_{LE}$.

When the system reaches the inductive limit as is pictorially described with respect to FIGS. 15A-15C, and there is an output from the function block 404, it is the function of the gain block 410 to cause the load commutated inverter circuit, the LCI, to draw an increased value of demagnetizing current $I_{LE}$ while having no effect on the torque producing component $I_{LT}$. Thus, the LCI can control the flux by providing the demagnetizing (inductive) current without disturbing the torque. This is accomplished by the output of the gain block 410 as being applied to the current reference 140' to, in effect, raise the minimum current commanded by that block. Blocks 140' and 146' contain a function similar to that described in connection with block 408 such that least signal out of gain block 410 will cause the lower limit in block 140' to be raised immediately to the existing level of the current as represented by the output of block 408. The lower limit is increased linearly with further signal out of block 410 causing the current reference 140' to raise the current. The angle reference 146' reacts in a similar manner to an output from gain 410 to cause a change in the angle; i.e., to shift toward $\alpha = 90°$.

Figure 19:
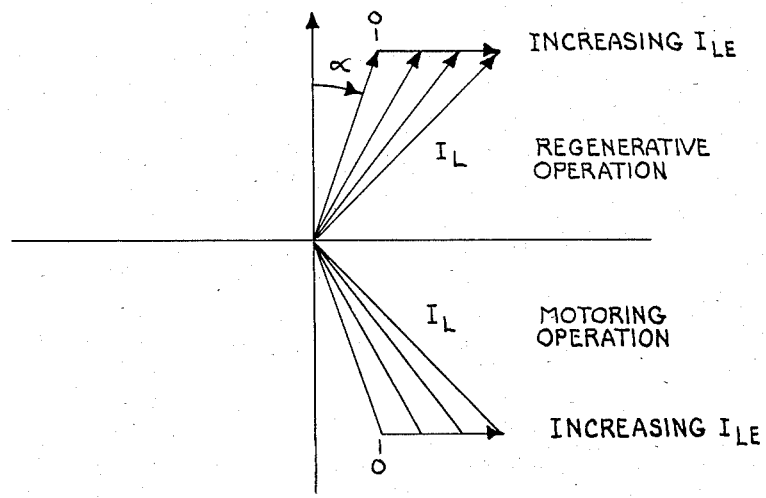

The dotted lines which interconnect blocks 140' and 146' illustrate the coordinated action. As indicated the same signal from gain 410 which results in an increase in the minimum current commanded by block 140' will cause the angle commanded by block 146' to be moved towards $\alpha = 90°$. The actions of blocks 140' and 146' are coordinated such that changes in the LCI current magnitude and angle cause the reactive component of the output of the LCI ($I_{LE}$) to be changed without disturbing the torque producing component of the current ($I_{LT}$). The effect of the signal out of block 410 on the magnitude and the angle of the LCI current is illustrated in the vector diagram of FIG. 19.

The gains of blocks 140' and 146' and the non-linearity of the gain block 410 are selected to give a gain in amperes of magnetizing current $I_{LE}$ for a given increment of $I_E^*$ command which is the same as the gain of the VAR generator in amperes of the current $I_X$ per increment of the $I_E^*$ command. This linearizing takes into account the fact that the current $I_{LE}$, which is reactive with respect to the voltage behind commutating reactance is not at quite the same angle as the $I_{ME}$ current which is reactive with respect to motor air gap voltage. This difference, however, is not substantial. The combination of all the characteristics of blocks 404, 410, 140' and 146' provide for a gain from the $I_E^*$ signal to motor exciting current which is the same whether the control is via the VAR generator to provide the current $I_X$ or via the LCI to the current $I_L$. This makes a crossover frequency of the total motor excitation current regulator loop unchanged regardless of which power circuit is actively controlling excitation.

Thus, the embodiment of the invention shown in FIG. 17 is to a method of maintaining control of the induction motor exciting current $I_{ME}$, utilizing the VAR generator and the load commutated inverter circuit (LCI) which provides a minimum change in the dynamics of the $I_{ME}$ regulating loop as a function of which power circuit is used to control the motor exciting current.

It was earlier mentioned, with respect to FIGS. 15A-C and 16A-C, that operation without a VAR controller is possible. Thus, if FIG. 17 were modified by eliminating the VAR controller and its control circuitry; i.e., that shown within the dashed line block 215, and the limits on the spillover signals (block 400) were set to zero, corresponding to zero capability of a VAR controller, the system would operate in the manner described with respect to FIGS. 15C and 16C.

Figure 20:
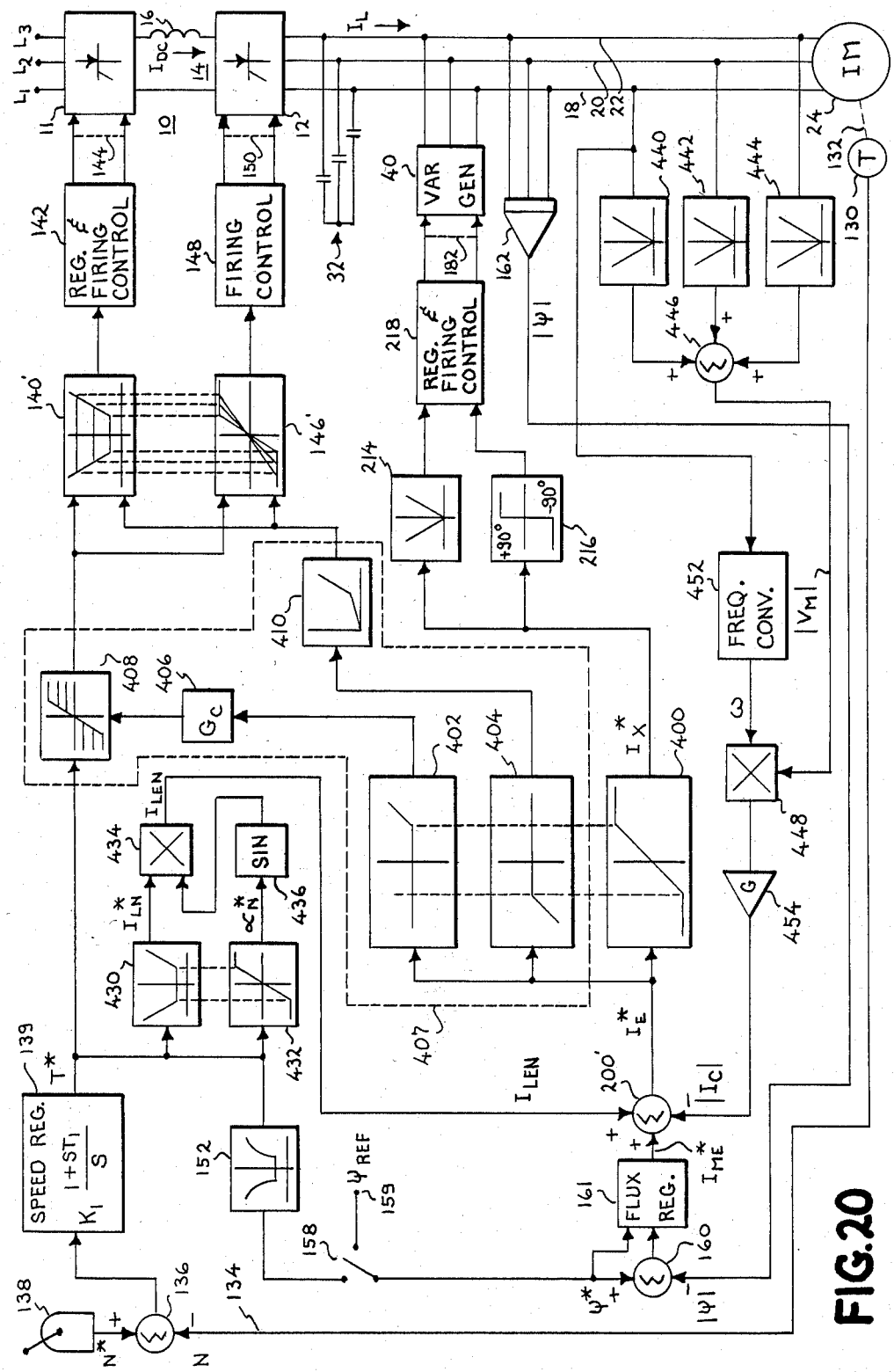
FIG. 20 is a major block diagram illustrating a further preferred embodiment of the present invention.

FIG. 20 shows another embodiment of the present invention. In the embodiment of FIG. 17, the output of summing junction 200 was the difference between the $I_{ME}^*$ signal and $I_{ME}$ signal, that is the difference between the commanded motor excitation current and the actual motor excitation current. In FIG. 17, the $I_{ME}$ signal was shown as coming from an $I_{ME}$ resolver 202 such as was discussed in detail with respect to FIGS. 12, 13 and 14. It will also be remembered from the discussion of FIG. 11 that there was shown a capacitor current $|I_C|$ which was derived from the actual sensing of the capacitor current. At that time, however, it was stated that this current could also be calculated. Further, with respect to discussion of FIG. 11, there was shown a method by which the excitation current required of the LCI ($I_{LE}$) could be developed. In further comparison summing junction 200 of FIG. 17 corresponds to the summing junction 166 in FIG. 11, this latter junction having the $I_{ME}^*$, $I_{LE}$ and $|I_C|$ signals applied thereto.

The $I_{ME}$ resolver earlier discussed required the sensing of both the motor current and motor voltage to resolve the current into its exciting component, the component in phase with the air gap flux. The FIG. 11 depiction includes the sensing of actual currents in the capacitor circuit and the necessitated use of such devices as current transformers. The embodiment shown in FIG. 20 is of the type of system basically shown in FIG. 17; i.e., a spillover type system, but which includes a calculation of the exciting component of motor current from available parameters to thus avoid the sensing and resolving of the various components of motor current.

Referencing now in particular FIG. 20, it is seen that this figure is of the same type as was described with respect to FIG. 17 with the exception of the derivation of the inputs to the summing junction at the output of the flux regulator, 200' in FIG. 20 and the omission of the $I_{ME}$ regulator 212 in FIG. 17. It will be remembered from FIG. 17 that summing junction 200 received the $I_{ME}^*$ signal from a flux regulator 164 and an $I_{ME}$ signal from an $I_{ME}$ resolver 202. In FIG. 20, summing junction 200' receives the $I_{ME}^*$ signal from flux regulator 164 and further receives a signal proportional to the absolute magnitude of the capacitor circuit current $|I_C|$ as well as a signal $I_{LEN}$. Signal $I_{LEN}$ represents, as will be understood as this description proceeds, the effect of the LCI on the exciting current available to the motor ignoring any effect of the spillover function involving circuits 400, 402, 406, 408 and 410.

From the preceding description it will be recognized that the motor exciting current $I_{ME}$ is equal to the sum of exciting currents provided by the capacitor circuit 32 and the VAR generator 40 reduced by the reactive current drawn by the load side converter of the LCI ($I_{LE}$). Thus:

$$I_{ME} = I_C + I_X - I_{LE} \tag{8}$$

From equation (6) above, it is known that $I_{LE} = I_L \sin \alpha$ and from equation (1) above it is known that the capacitor current $I_C$ is defined by the expression:

$$I_C = V_M \omega C. \tag{1}$$

(If the passive network is parallel with motor includes other circuit elements in addition to pure capacitors is shown in 32, the total network admittance would be used in place of $\omega C$ above.) By rearranging and combining above, it is apparent that the value of the current needed to be provided by the VAR generator which is represented by the $I_X^*$ can be determined by the expression:

$$I_X^* = I_{ME}^* - V_M \omega C + I_L \sin \alpha \tag{9}$$

The mathematical expression of equation (9) above is correct for the case where the spillover features as shown in the broken line enclosure of FIG. 20 are not active. In this case the exciting current correction is entirely by the action of the VAR generator and thus $I_E^*$ is equal to $I_X^*$. In the presence of the spillover, however, the current and angle commands to the LCI are modified by the blocks 402 through 410 as described with respect to FIG. 17. The effect of this spillover feature is to cause the excitation portion of the current from the LCI to have two components. The first component is that which occurs "naturally" called $I_{LEN}$ and the second component is that induced by the action of the spillover function. This current is called $I_{LES}$. Thus:

$$I_{LE} = I_{LEN} + I_{LES} \tag{10}$$

In order to cause the calculated $I_{ME}$ regulation to take place and to function properly, only the natural component of $I_{LE}$ should be used in expression (6).

In FIG. 20 the $I_{LEN}$ signal is shown as being derived as follows. The $T^*$ signal out of speed regulator 139 is applied to a current reference function block 430 and to an angle reference function block 432. Block 430 is essentially a absolute value circuit with a lower limit while block 432 is a linear amplifier with limits and it will be recognized that these blocks are substantially identical to blocks 140 and 146 as found in FIG. 11. The output of block 430 designated $I_{LN}^*$ is applied as one input to a multiplier 434. The output of function block 432 designated $\alpha_N^*$ is applied to a sine function 436 the output of which is the sine of its input. The output of the block 436 forms the second input to the multiplier 434. The output of multiplier 434 is a signal proportional to the amount of exciting current that will be supplied to the motor by the LCI in the absence of the spillover and this signal $I_{LEN}$ serves as one input to the summing junction 200'. Junction 200' also receives the $I_{ME}^*$ signal from the flux generator 164 as earlier described.

This derivation of the $I_{LEN}$ signal is substantially like that for signal $I_{LE}$ from block 168 in FIG. 11.

The other input to the summing junction 200 is the $|I_C|$ signal proportional to the capacitor current. This signal is derived in accordance with equation (1) above. In this respect it is first seen that the terminal voltages of the motor are applied to three absolute value circuits 440, 442 and 444, the outputs of which are supplied to a summing junction 446. The output of summing junction 446 is proportional to the absolute magnitude $|V_M|$ of the motor terminal voltage. This signal $|V_M|$ serves as one input to a multiplier 448. The flux magnitude signal is derived as in FIG. 11 by individual phase integrators and summing absolute value circuit as indicated by 162. The output of 162 is the $|\psi|$ signal which is applied to the junction 160 in the manner previously described.

The second input to multiplier 448 is the signal $\omega$ which is proportional to the motor stator frequency. This $\omega$ signal could be derived from any suitable manner but in the embodiment illustrated, it is shown as being the output of a frequency converter 452 which has as its input one of the motor terminal voltage signals; e.g., the voltage on lines 18. This frequency converter could, for example, be that described in U.S. Pat. No. 4,454,470 "Method and Apparatus for Frequency Measurement of an Alternating Current Signal" by F. H. Boettner and L. H. Walker, issued June 12, 1984 or that described in copending U.S. Pat. application Ser. No. 638,003 "Frequency Measurement System" by J. W. Sember and L. H. Walker filed Aug. 6, 1984, which patent and application are specifically incorporated hereinto by reference.

The output of the multiplier 448, the product $|V_M|\omega$, is applied to a gain 454 which gain is proportional to the capacitance (admittance) of the circuit 132 such that the output of that gain circuit 454 is the $|I_C|$ signal in accordance with equation (1) above. In other respects the operation of the circuit is as was described in FIG. 17, again noting that the $I_{ME}$ regulator 212 which provided at its output the command $I_E^*$ is not necessary in this case since the desired value of $I_E^*$ in FIG. 17 is calculated directly rather than by integrating an error in $I_{ME}$.

Figure 21:
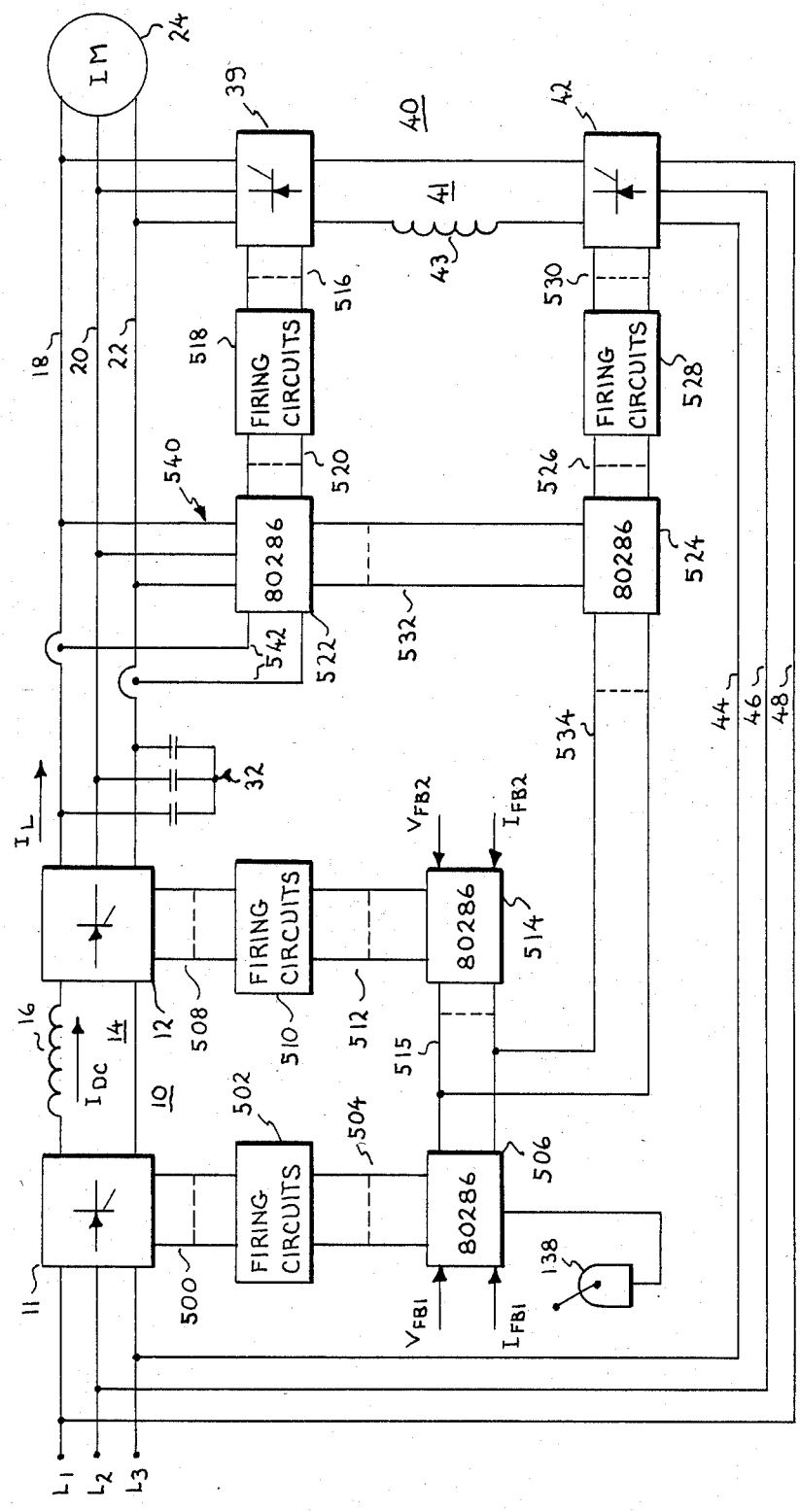
FIG. 21 is a major block diagram illustrating a digital implementation of the present invention.

While the description thus far has all been in the nature of circuitry in analog form, which is the form best able to be understood, it is readily apparent to those skilled in the art that an actual control function of the present invention could also be performed by appropriately programmed computer equipment. This is in keeping with the description in the previously referenced U.S. Pat. No. 4,449,087 which has been incorporated by reference. In that patent, control of the LCI was indicated as being by computer and, in a similar vein, the several control functions of the various embodiments described can also be performed by computer software. One possible form of such a control is illustrated in FIG. 21 and in the attached and previously referenced appendix which is a listing for use in Intel 80286 computers. In FIG. 21 the power circuit is identical to that shown in the several complete illustrations, e.g., FIGS. 1, 11, 17 and 20. Firing of the rectifiers of the LCI source side converter is by way of appropriate firing signals which are delivered to that converter on lines 500 from firing circuits 502. Firing circuits 502 are controlled by signals on lines 504 from a suitable data processor 506 (for example, an Intel 80286 computer system). Processor 506 receives an input from operator control 138 as well as voltage and current feedback signals $V_{FB1}$ and $I_{FB1}$ from the input lines to converter 11 as known in the art.

In a similar manner, LCI load side converter 12 receives firing signals via lines 508 from a firing circuit 510 which is controlled by signals on lines 512 from a second data processor 514. Processor 514 receives voltage and current feedback signals $V_{FB2}$ and $I_{FB2}$ from the output of converter 12, again as well known. Processors 506 and 514 are interconnected as by bus 515 to provide communication therebetween.

Variable VAR generator 40 is furnished with electrical power, by way of a DC link circuit 41, from an AC to DC converter 42 connected to terminals $L_1$, $L_2$ and $L_3$ by lines 44, 46 and 48. In the present embodiment as presented by the program of the attached appendix, the VAR generator 40 is of the autosequentially commutated inverter type; e.g., see FIG. 8.

In a manner similar to that described with respect to the LCI, the thyristors of circuit 39 of generator 40 are fired by signals delivered over lines 516 from firing circuits 518 controlled via lines 520 by a data processor 522. Processor 524, lines 526, firing circuits 528 and lines 530 comprise a like control for converter 42. Bus 532 provides a communication link between processors 522 and 524 while bus 534 provides a communication link between processors 506, 514 and 524. Processor 522 further receives voltage feedback signals over lines 540 and current feedback signals over lines 542 from the lines 18, 20 and 22 connecting the LCI circuit with the motor 24.

The digital implementation depicted by FIG. 21 and defined by the program appendix provides substantially the identical operation as was described earlier with respect to the analog embodiments, particularly that represented by FIG. 20.

Thus, it is seen that by the present invention a simple load commutated inverter circuit is capable of supplying power to an induction motor to provide the advantages and ruggedness of an induction motor along with the relative inexpensiveness associated with an LCI type drive.

While there have been shown and described what are at present considered to be the preferred embodiments of the invention, modifications thereto will readily occur to those skilled in the art. It is not desired, therefore, that the invention be limited to the specific embodiments as shown and described, but it is intended to cover in the appended claims all such modifications that come within the true spirit and scope of the invention.

What is claimed is:

1. A system for controlling the operation of an alternating current induction motor having windings furnished with electrical excitation from a polyphase alternating current power source comprising:
   (a) a controllable load commutated inverter circuit, including a controllable source side alternating current to direct current converter and a load side direct current to alternating current converter interconnected by a direct current link, connected between said power source and said induction motor, said load commutated inverter circuit having an output furnishing an output current having real and demagnetizing polarity exciting current components to said motor;
   (b) a capacitor circuit connected to the motor windings and to the output of said load commutated inverter circuit for furnishing leading exciting current to said motor and said load commutated inverter circuit;

(c) a controllable VAR generator connected to the motor windings and to the output of said load commutated inverter circuit for furnishing exciting current to said motor and said load commutated inverter circuit;

(d) means to generate a motor operation command signal;

(e) a first control path including means responsive to said motor operation command signal for controlling the operation of said alternating current to direct current converter;

(f) a second control path responsive to said motor operation command signal for controlling the operation of said direct current to alternating current converter;

(g) a third control path for controlling the exciting current furnished to said motor by said VAR generator, said third control path including, (1) means to generate an exciting current command signal proportional to the amount of exciting current required for a desired motor operation; and, (2) means responsive to said exciting current command signal to control said VAR generator.

2. The invention in accordance with claim 1 wherein said last recited means includes:

(a) means to develop a first current signal proportional to the exciting current component supplied to said motor from said load commutated inverter circuit;

(b) means to develop a second current signal proportional to current furnished to said system by said capacitor circuit;

(c) means to combine said exciting current command signal, and said first and second current signals to develop a difference signal; and, (d) means responsive to said difference signal to control the operation of said VAR generator.

3. The invention in accordance with claim 2 wherein said means to develop said second current signal includes means to sense the leading exciting current furnished to said motor by said capacitor circuit.

4. The invention in accordance with claim 2 wherein said means to develop said second current signal, a signal $I_C$, includes:

(a) means for deriving a signal, $V_M$, proportional to the motor voltage;

(b) means to develop a signal, $\omega$, proportional to motor stator frequency;

(c) means to provide a factor, C, proportional to the capacitance of said capacitor; and, (d) combining means to combine said signal $V_M$, said signal $\omega$ and said factor C to produce said signal $I_C$.

5. The invention in accordance with claim 4 wherein said combining means includes a multiplier and wherein said combination is achieved in accordance with the relationship: $I_C = V_M \cdot \omega \cdot C$.

6. The invention in accordance with claim 2 wherein said means to develop said first current signal includes:

(a) means to develop a magnitude signal proportional to the magnitude of said output current of said load commutated inverter;

(b) means to develop an angle signal proportional to an angle, with respect to a reference, of said output current; and, (c) means to combine said magnitude signal and said angle signal to provide said second current signal.

7. The invention in accordance with claim 6 wherein said means to combine is operative in accordance with the relationship:

$$I_{LE} = I_L \sin \alpha,$$

wherein, $I_{LE}$ = second current signal
$I_L$ = magnitude signal
$\alpha$ = angle signal.

8. The invention in accordance with claim 2 wherein said means to develop said first current signal includes:

(a) means to develop a magnitude signal proportional to a magnitude of said output current represented by said motor operation command signal;

(b) means to develop an angle signal proportional, with respect to a reference, to an angle of output current represented by said motor operation command signal; and (c) means to combine said magnitude signal and said angle signal to provide said first current signal.

9. The invention in accordance with claim 8 wherein said means to combine is operative in accordance with the relationship:

$$I_{LE} = I_L \sin \alpha;$$

wherein, $I_{LE}$ = second current signal
$I_L$ = magnitude signal
$\alpha$ = angle signal.

10. The invention in accordance with claim 1 wherein said means to generate an exciting current command signal includes:

(a) means to provide a signal proportional to a desired level of flux of the motor;

(b) means to derive an actual flux signal proportional to the actual flux of the motor;

(c) means to combine said signal proportional to the desired level of flux with said actual flux signal to develop a first difference signal; and, (d) means responsive to said first difference signal to generate said exciting current command signal.

11. The invention in accordance with claim 10 wherein said means responsive to said first difference signal includes:

(a) means to develop a first current signal proportional to the exciting current component supplied to said motor from said load commutated inverter circuit;

(b) means to develop a second current signal proportional to current furnished to said system by said capacitor circuit;

(c) means to combine said exciting current command signal and said first and second current signals to develop a second difference signal; and (d) means responsive to said second difference signal to control the operation of said VAR generator.

12. The invention in accordance with claim 10 wherein said means to derive said actual flux signal includes:

(a) means to derive said voltage signals proportional to motor voltages;

(b) means to integrate said voltage signals to provide integrated signals; and, (c) means to combine said integrated signals to provide said actual flux signal.

13. The invention in accordance with claim 11 wherein said means to develop said second current signal includes means to sense the leading exciting current furnished to said motor by said capacitor circuit.

14. The invention in accordance with claim 11 wherein said means to develop said second current signal, a signal $I_C$, includes:
   (a) means for deriving a signal, $V_M$, proportional to the motor voltage;
   (b) means to develop a signal, $\omega$, proportional to motor stator frequency;
   (c) means to provide a factor, C, proportional to the capacitance of said capacitor; and,
   (d) combining means to combine said signal $V_M$, said signal $\omega$ and said factor C to produce said signal $I_C$.

15. The invention in accordance with claim 14 wherein said combining means includes a multiplier and wherein said combination is achieved in accordance with the relationship: $I_C = V_M \cdot \omega \cdot C$.

16. The invention in accordance with claim 11 wherein said means to develop said first current signal includes:
   (a) means to develop a magnitude signal proportional to the magnitude of said output current of said load commutated inverter;
   (b) means to develop an angle signal proportional to an angle, with respect to a reference, of said output current; and,
   (c) means to combine said magnitude signal and said angle signal to provide said second current signal.

17. The invention in accordance with claim 16 wherein said means to combine is operative in accordance with the relationship:

$$I_{LE} = I_L \sin \alpha,$$

wherein,
$I_{LE}$ = second current signal
$I_L$ = magnitude signal
$\alpha$ = angle signal.

18. The invention in accordance with claim 11 wherein said means to develop said first current signal includes:
   (a) means to develop a magnitude signal proportional to a magnitude of said output current represented by said motor operation command signal;
   (b) means to develop an angle signal proportional, with respect to a reference, to an angle of output current represented by said motor operation command signal; and
   (c) means to combine said magnitude signal and said angle signal to provide said first current signal.

19. The invention in accordance with claim 18 wherein said means to combine is operative in accordance with the relationship:

$$I_{LE} = I_L \sin \alpha;$$

wherein,
$I_{LE}$ = second current signal
$I_L$ = magnitude signal
$\alpha$ = angle signal.

20. A system for controlling the operation of an alternating current induction motor having windings furnished with electrical excitation from a polyphase alternating current power source comprising:
   (a) a controllable load commutated inverter circuit, including a controllable source side alternating current to direct current converter and a load side direct current to alternating current converter interconnected by a direct current link, connected between said power source and said induction motor, said load commutated inverter circuit having an output furnishing an output current having a magnitude and an angle, with respect to a predetermined reference, to said motor;
   (b) a capacitor circuit connected to the motor windings and to the output of said load commutated inverter circuit for furnishing leading exciting current to said motor;
   (c) a controllable VAR generator connected to the motor windings and to the output of said load commutated inverter circuit for furnishing exciting current to said motor;
   (d) means to generate a motor operation command signal;
   (e) a first control path including means responsive to said motor operation command signal for controlling the operation of said alternating current to direct current converter to thereby control the magnitude of said output current.
   (f) a second control path responsive to said motor operation command signal for controlling the operation of said direct current to alternating current converter to thereby control the angle of said output current;
   (g) means to develop an exciting current command signal representing a level of motor exciting current required for a desired level of motor operation;
   (h) means responsive to said motor operation command signal to develop a first exciting current signal representing exciting current furnished to said motor by the output current of said load commutated inverter circuit;
   (i) means to develop a second exciting current signal representing the exciting current resulting from said capacitor circuit;
   (j) means to combine said exciting current command signal, said first exciting current signal and said second exciting current signal to produce an exciting current correctional signal representing a change in motor exciting current required to excite the motor for the desired level of operation; and,
   (k) means including said VAR generator responsive to said exciting current correction signal to vary the motor exciting current.

21. A method of controlling the operation of an alternating current induction motor having windings furnished with electrical excitation from a polyphase alternating current power source comprising:
   (a) furnishing a current having real and demagnetizing polarity exciting current components to said motor using a controllable load commutated inverter circuit connected between the power source and said induction motor, said load commutated inverter circuit including a controllable source side alternating current to direct current converter and a load side direct current to alternating current converter interconnected by a direct current link;
   (b) furnishing leading exciting current to said motor from a capacitor circuit connected to the motor windings and to said load commutated inverter circuit;
   (c) furnishing additional exciting current to said motor from a controllable VAR generator connected to the motor windings and to said load commutated inverter circuit;

(d) generating a motor operation command signal;

(e) controlling the operation of said alternating current to direct current converter in respose to said motor operation command signal;

(f) controlling the operation of said direct current to alternating current converter in response to said motor operation command signal;

(g) generating an exciting current command representing the amount of exciting current required for a desired motor operation; and, (h) controlling the exciting current furnished to said motor by said VAR generator in response to said motor operation command signal.

22. The method in accordance with claim 21 wherein the control of the control of the VAR generator in response to said exciting current command signal includes the steps:

(a) developing a first current signal proportional to exciting current supplied to said motor from said load commutated inverter circuit;

(b) developing a second current signal proportional to current furnished to said system by said capacitor circuit;

(c) combining said exciting current command signal and said first and second current signals to develop a difference signal; and, (d) controlling the operation of said VAR generator in response to said difference signal.

23. The invention in accordance with claim 22 wherein the development of said second current signal includes sensing the leading exciting current furnished to said motor.

24. The invention in accordance with claim 22 wherein the development of said second current signal, a signal $I_C$, includes the steps:

(a) deriving a signal, $V_M$, proportional to the motor voltage;

(b) developing a signal, $\omega$, proportional to motor stator frequency;

(c) providing a factor, C, proportional to the capacitance of said capacitor; and, (d) combining said signal $V_M$, said signal $\omega$ and said factor C to produce said signal $I_C$.

25. The invention in accordance with claim 24 wherein said combining step is achieved in accordance with the relationship: $I_C = V_M \cdot \omega \cdot C$.

26. The method in accordance with claim 22 wherein said first current signal is developed by steps including:

(a) developing a magnitude signal proportional to the magnitude of said output current of said load commutated inverter;

(b) developing an angle signal proportional to an angle, with respect to a reference, of said output current; and, (c) combining said magnitude signal and said angle signal to provide said second current signal.

27. A method for controlling the operation of an alternating current induction motor having windings furnished with electrical excitation from a polyphase alternating current power source comprising:

(a) furnishing an electrical output current having a magnitude and an angle, with respect to a predetermined reference, to said motor using a controllable load commutated inverter circuit connected between the power source and said induction motor, said load commutated inverter circuit including a controllable source side alternating current to direct current converter and a load side direct current to alternating current converter interconnected by a direct current link;

(b) furnishing leading exciting current to said motor from a capacitor circuit connected to the motor windings and to the output of said load commutated inverter circuit;

(c) furnishing exciting current to said motor from a controllable VAR generator connected to the motor windings and to the output of said load commutated inverter circuit;

(d) generating a motor operation command signal;

(e) controlling the operation of said alternating current to direct current converter to thereby control the magnitude of said output current as a function of said motor operation command signal;

(f) controlling the operation of said direct current to alternating current converter to thereby control the angle of said output current as a function of said motor operation command signal;

(g) developing an exciting current command signal representing a level of motor exciting current required for a desired level of motor operation;

(h) developing a first exciting current signal representing exciting current furnished to said motor by the output current of said load commutated inverter circuit as a function of said motor operation command signal;

(i) developing a second exciting current signal representing the exciting current resulting from said capacitor circuit;

(j) combining said exciting current command signal, said first exciting current signal and said second exciting current signal to produce an exciting current correctional signal representing a change in motor exciting current required to excite the motor for the desired level of operation; and, (k) selectively controlling said VAR generator, said in response to said exciting current correction signal to vary the motor exciting current.

* * * * *